US012717441B2

(12) United States Patent
Lim

(10) Patent No.: US 12,717,441 B2
(45) Date of Patent: Aug. 25, 2026

(54) ELECTRONIC DEVICE WITH TOUCH INPUT SYSTEM SUPPORTING A PEN AND CAPABLE OF REDUCING NOISE

(71) Applicant: SAMSUNG DISPLAY CO., LTD., Yongin-si (KR)

(72) Inventor: Sanghyun Lim, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 85 days.

(21) Appl. No.: 18/812,213

(22) Filed: Aug. 22, 2024

(65) Prior Publication Data

US 2025/0138667 A1 May 1, 2025

(30) Foreign Application Priority Data

Nov. 1, 2023 (KR) ........................ 10-2023-0148989

(51) Int. Cl.
*G06F 3/041* (2006.01)
*G06F 3/044* (2006.01)

(52) U.S. Cl.
CPC ...... *G06F 3/04164* (2019.05); *G06F 3/04182* (2019.05); *G06F 3/0446* (2019.05); *G06F 3/0448* (2019.05); *G06F 2203/04104* (2013.01); *G06F 2203/04111* (2013.01)

(58) Field of Classification Search
CPC ............. G06F 3/04164; G06F 3/04182; G06F 3/0446; G06F 3/0448; G06F 2203/04104; G06F 2203/04111
USPC .......................................................... 345/173
See application file for complete search history.

(56) References Cited

U.S. PATENT DOCUMENTS

| | | | | |
|---|---|---|---|---|
| 9,817,533 | B2 | 11/2017 | Bulea et al. | |
| 11,726,625 | B2 | 8/2023 | Kim et al. | |
| 2016/0041677 | A1 | 2/2016 | Tahara | |
| 2016/0179134 | A1* | 6/2016 | Ryu | G06F 1/169 345/174 |
| 2017/0262093 | A1* | 9/2017 | Noguchi | G06F 3/04164 |
| 2023/0359305 | A1* | 11/2023 | Vaze | G06F 3/04164 |
| 2025/0264946 | A1* | 8/2025 | Moon | G06F 3/046 |
| 2025/0390186 | A1* | 12/2025 | Kim | G06F 3/04164 |

FOREIGN PATENT DOCUMENTS

| | | |
|---|---|---|
| JP | 5819565 | 11/2015 |
| KR | 10-2261698 | 6/2021 |
| KR | 10-2022-0169972 | 12/2022 |

* cited by examiner

*Primary Examiner* — Mark Edwards
(74) *Attorney, Agent, or Firm* — F. CHAU & ASSOCIATES, LLC

(57) ABSTRACT

An electronic device includes a sensor layer and a sensor driver. The sensor layer includes a first electrode, a first auxiliary electrode overlapped with the first electrode, a first loop electrode overlapped with the first electrode, a first loop trace line electrically connected to a first end portion of the first loop electrode, and a second loop trace line electrically connected to a second end portion of the first loop electrode that is spaced apart from the first end portion. The first loop electrode, the first loop trace line, and the second loop trace line are connected in a first closed loop.

20 Claims, 14 Drawing Sheets

ELECTRONIC DEVICE WITH TOUCH INPUT SYSTEM SUPPORTING A PEN AND CAPABLE OF REDUCING NOISE

CROSS-REFERENCE TO RELATED APPLICATIONS

This patent application claims priority under 35 U.S.C. § 119 to Korean Patent Application No. 10-2023-0148989 filed on Nov. 1, 2023, in the Korean Intellectual Property Office, the disclosure of which is incorporated by reference in its entirety herein.

1. Technical Field

Embodiments of the present disclosure are directed to an electronic device to sense an input by a pen.

2. Discussion of Related Art

Multimedia electronic devices, such as a television (TV), a cellular phone, a tablet computer, a navigation system, and a game console, include a display device that displays an image. The electronic device may include a touch-based input system for enabling a user to intuitively, conveniently, and easily input information or a command, different from a general input system, such as a button, a keyboard, or a mouse.

A sensor layer of the touch-based input system may sense a touch or an input by an object (e.g., a finer, a pen/stylus). For example, the pen may be used for sketching or drawing. However, use of the pen may introduce noise that makes it difficult to recognize the touch or approach of the pen. Thus, there is a need for a touch-based input system that supports a pen and is capable of reducing noise.

SUMMARY

Embodiments of the present disclosure provide an electronic device to sense an input by a pen.

According to an embodiment of the present disclosure, an electronic device includes a sensor layer, and a sensor driver to drive the sensor layer. The sensor layer includes a first electrode, a first auxiliary electrode overlapped with the first electrode, a first loop electrode overlapped with the first electrode, a first loop trace line electrically connected to a first end portion of the first loop electrode, and a second loop trace line electrically connected to a second end portion of the first loop electrode that is spaced apart from the first end portion. The first loop electrode, the first loop trace line, and the second loop trace line are connected in a first closed loop.

A capacitance of a first base capacitor of the first electrode may be substantially the same as a capacitance of a second base capacitor of the first loop electrode.

The first loop electrode may include a first divided loop electrode and a second divided loop electrode spaced apart from each other in a first direction, and wherein the first auxiliary electrode may be interposed between the first divided loop electrode and the second loop divided electrode.

The first electrode may include a plurality of sensor patterns overlapped with the first loop electrode and the first auxiliary electrode, and a bridge pattern electrically connected to the plurality of sensor patterns, and the bridge pattern may be disposed on a same layer as a layer for the first loop electrode and the first auxiliary electrode.

The sensor driver may receive a first signal from the first electrode, and may receive a second signal from the first closed loop.

The sensor driver may include a differential amplifier, and a first terminal of the differential amplifier may receive the first signal, and a second terminal of the differential amplifier receives the second signal.

The sensor driver may include a plurality of differential amplifiers and an analog-to-digital converter. The plurality of differential amplifiers may receive the first signal and the second signal, respectively. The analog-to-digital converter may receive a plurality of signals from the plurality of differential amplifiers, and the sensor driver may perform a differential operation on data output from the analog-to-digital converter.

The sensor layer may include a second electrode crossing the first electrode, a second auxiliary electrode overlapped with the second electrode and crossing the first auxiliary electrode, a second loop electrode overlapped with the second electrode and crossing the first loop electrode, a third loop trace line electrically connected to a third end portion of the second loop electrode, and a fourth loop trace line electrically connected to a fourth end portion of the second loop electrode that is spaced apart from the third end portion. The second loop electrode, the third loop trace line, and the fourth loop trace line may be connected in a second closed loop.

The sensor layer may include a first trace line electrically connected to the first electrode, a second trace line electrically connected to the second electrode, a third trace line electrically connected to the first auxiliary electrode, and a fourth trace line electrically connected to the second auxiliary electrode.

The first trace line may be connected to the first electrode in a first region, the first auxiliary electrode may be connected to the third trace line in a second region, and the first region and the second region may be spaced apart from each other in a direction in which the first electrode extends.

The electronic device may further include a circuit board electrically connected to the sensor layer, the sensor driver may be mounted on the circuit board, the circuit board may include a connection line connected to the first loop trace line and the second loop trace line, and the first closed loop may be further include the connection line.

According to an embodiment of the present disclosure, an electronic device includes a plurality of first electrodes arranged in a first direction and extending in a second direction crossing the first direction; a plurality of first loop electrodes arranged in the first direction, extending in the second direction, and overlapped with the plurality of first electrodes; and a plurality of first loop lines electrically connected to the plurality of first loop electrodes in a one-to-one correspondence. One first loop electrode among the plurality of first loop electrodes and one first loop line among the plurality of first loop lines are connected to one another in a closed loop.

The one first loop line may include a first loop trace line electrically connected to a first end portion of the one first loop electrode, a second loop trace line electrically connected to a second end portion of the one first loop electrode that is spaced apart from the first end portion, and a connection line connected to the first loop trace line and the second loop trace line.

The electronic device may further include a differential amplifier to receive a first signal from one first electrode among the plurality of first electrodes and to receive a second signal from the connection line.

The electronic device may further include a first differential amplifier to receive a first signal from one first electrode among the plurality of first electrodes, a second differential amplifier to receive a second signal from the connection line, an analog-digital converter to receive signals from the first differential amplifier and the second differential amplifier and to output data, and a differential operator to perform a differential operation on the data.

A capacitance of a first base capacitor of each of the plurality of first electrodes may be substantially the same as a capacitance of a second base capacitor of the plurality of first loop electrodes.

The electronic device may further include a plurality of second electrodes arranged in the second direction and extending in the first direction, a plurality of second loop electrodes arranged in the second direction, extending in the first direction, and overlapped with the plurality of second electrodes, and a plurality of second loop lines electrically connected to the plurality of second loop electrodes in a one-to-one correspondence, and one second loop electrode among the plurality of second loop electrodes and one second loop line among the plurality of second loop lines, are connected to one another in a closed loop.

According to an embodiment of the present disclosure, an electronic device includes a sensor layer, and a sensor driver to drive the sensor layer and to selectively operate in a first mode for sensing a touch input or a second mode for sensing a pen input. The sensor layer includes a first electrode extending in a first direction, a second electrode extending in a second direction crossing the first direction and crossing the first electrode, a first loop electrode extending in the first direction and overlapped with the first electrode, a second loop electrode extending in the second direction and overlapped with the second electrode, a first loop line connected to the first loop electrode in a closed loop, and a second loop line connected to the second loop electrode in a closed loop. The sensor driver receives a first signal from the first electrode, and receives a second signal from the first loop line, in the second mode.

The sensor driver may include a differential amplifier, and a first terminal of the differential amplifier may receive the first signal, and a second terminal of the differential amplifier receives the second signal.

The sensor driver may include a plurality of differential amplifiers and an analog-to-digital converter. The plurality of differential amplifiers may receive the first signal and the second signal, respectively, in the second mode. The analog-to-digital converter may receive a plurality of signals from the plurality of differential amplifiers. The sensor driver may perform a differential operation on data output from the analog-to-digital converter.

According to an embodiment of the present disclosure, an electronic device includes a sensor layer including a sensing region and a peripheral region adjacent to the sensing region and a sensor driver to drive the sensor layer. The sensor layer includes a plurality of first electrodes disposed in the sensing region and extending in a first direction, a plurality of first auxiliary electrodes disposed in the sensing region, disposed to be adjacent to the plurality of first electrodes and extending in the first direction, a plurality of first loop electrodes disposed in the sensing region, disposed to be adjacent to the plurality of first electrodes, and extending in the first direction, a first loop trace line disposed in the peripheral region and electrically connected to a first end portion of at least one first loop electrode among the plurality of first loop electrodes, a second loop trace line disposed in the peripheral region and electrically connected to a second end portion of the at least one first loop electrode that opposes the first end portion, and a connection line disposed in the peripheral region and electrically connected to one end portion of the first loop trace line and one end portion of the second loop trace line.

DETAILED DESCRIPTION

Figure 1A:
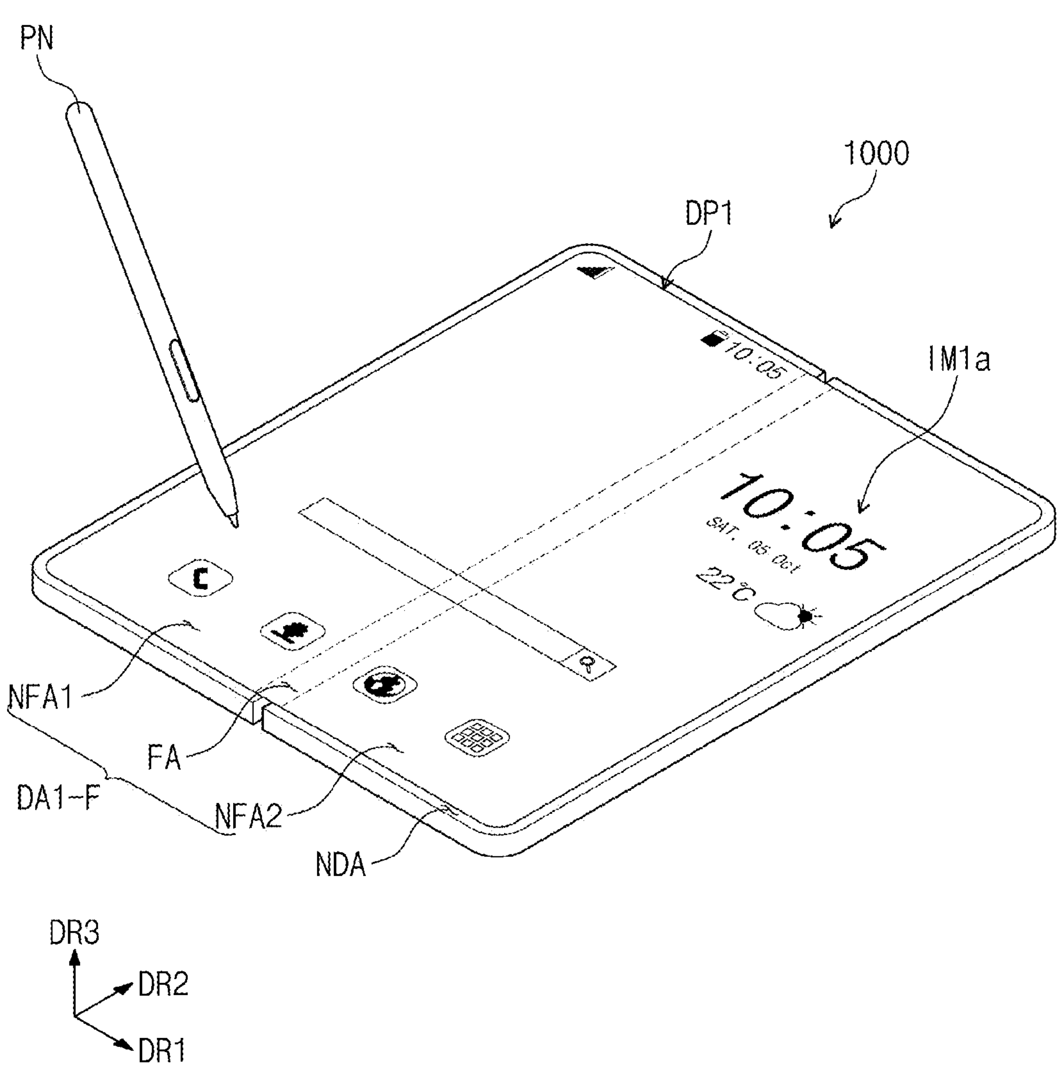
FIG. 1A is a perspective view illustrating an electronic device according to an embodiment of the present disclosure.

In the specification, the expression that a first component (or region, layer, part, portion, etc.) is "on", "connected to", or "coupled to" a second component means that the first component is directly on, connected to, or coupled to the second component or means that a third component is interposed therebetween.

The same reference numeral will be assigned to the same component. The term "and/or" includes any and all combinations of one or more of associated components. Herein, the singular forms are intended to include the plural forms unless the context clearly indicates otherwise.

The terms "part" and "unit" refer to a software component or a hardware component to perform a specific function. The hardware component may include field-programmable gate array (FPGA) or an application-specific integrated circuit (ASIC). Software components may indicate data used by executable codes and/or executable codes in a storage medium which is able to be addressed. Accordingly, software components may be, for example, object-oriented software components, class components, and task components, and may include processes, functions, properties, procedures, subroutines, program code segments, driver data, firmware, micro-codes, circuits, data, database, data structures, tables, arrangements or variables.

Hereinafter, embodiments of the present disclosure will be described with reference to accompanying drawings.

Figure 1B:
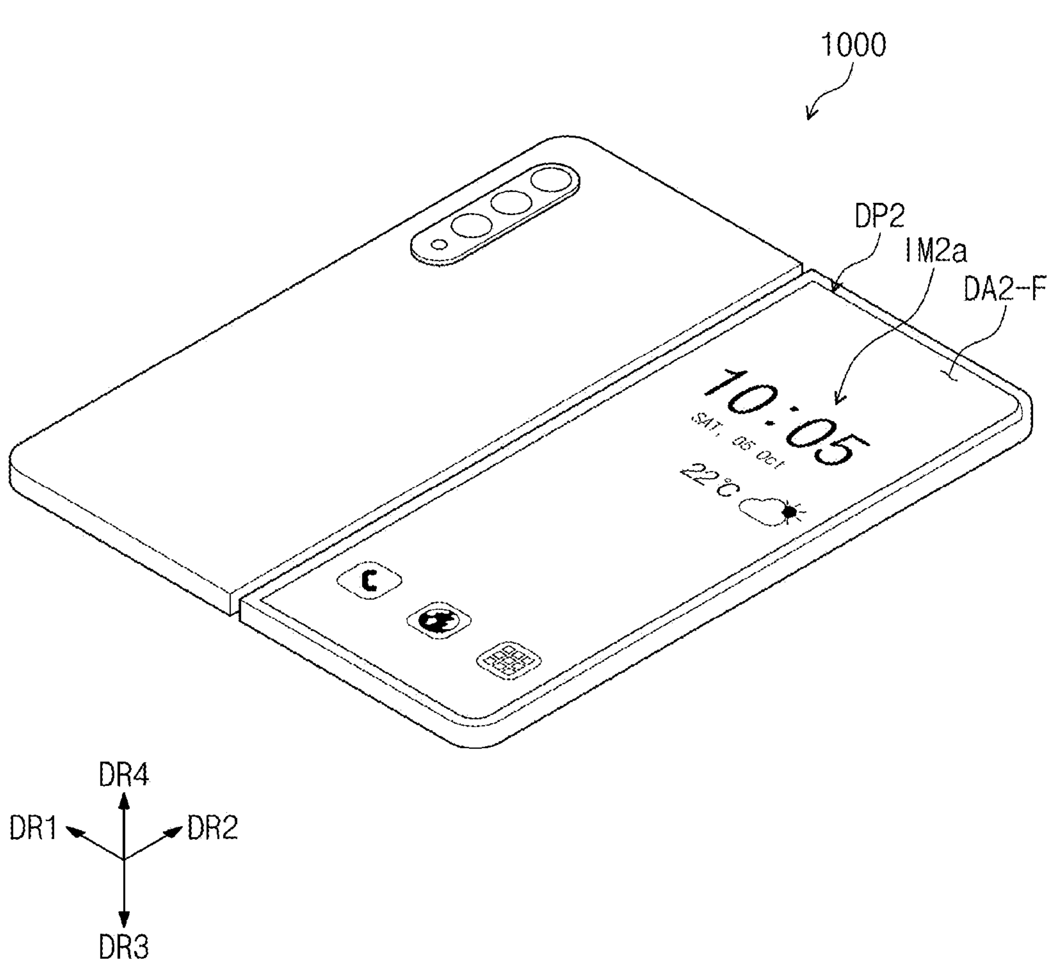
FIG. 1B is a bottom perspective view illustrating an electronic device according to an embodiment of the present disclosure.

FIG. 1A is a perspective view illustrating an electronic device 1000 according to an embodiment of the present disclosure. FIG. 1B is a bottom perspective view of the electronic device 1000 according to an embodiment of the present disclosure.

Referring to FIGS. 1A and 1B, the electronic device 1000 may be a device activated in response to an electrical signal. For example, the electronic device 1000 may display an image and may sense inputs applied from the outside. The external input may be a user input. The user input may include any one of various external inputs, such as a part of a physical body of the user (e.g., a finger), a pen or stylus, light, heat, or pressure, or the combination thereof.

The electronic device 1000 may include a first display panel DP1 and a second display panel DP2. The first display panel DP1 and the second display panel DP2 may be separated from each other. The first display panel DP1 may be referred to as a main display panel, and the second display panel DP2 may be an auxiliary display panel or an external display panel.

The first display panel DP1 may include a first display unit DA1-F and the second display panel DP2 may include a second display unit DA2-F. The area of the second display panel DP2 may be smaller than the area of the first display panel DP1. The area of the first display unit DA1-F may be greater than the area of the second display unit DA2-F to correspond to the sizes of the first display panel DP1 and the size of the second display panel DP2.

The first display unit DA1-F may be arranged in a plane substantially parallel to a plane defined by a first direction DR1 and a second direction DR2, when the electronic device 1000 is unfolded. The thickness direction of the electronic device 1000 may be parallel to a third direction DR3 crossing the first direction DR1 and the second direction DR2. Accordingly, front surfaces (or top surfaces) and rear surfaces (or bottom surfaces) of members constituting the electronic device 1000 may be defined based on the third direction DR3.

The first display panel DP1 or the first display unit DA1-F may include a folding region FA folded and unfolded, and a plurality of non-folding regions NFA1 and NFA2 spaced apart from each other while interposing the folding region FA between the non-folding regions NFA1 and NFA2. The second display panel DP2 may be overlapped with any one of the plurality of non-folding regions NFA1 and NFA2. For example, the second display panel DP2 may be overlapped with the first non-folding region NFA1.

A display direction of a first image IM1*a* displayed on a portion of the first display panel DP1, for example, in the first non-folding region NFA1 of the first display panel DP1 may be opposite to a display direction of a second image IM2*a* displayed on the second display panel DP2. For example, the first image IM1*a* may be displayed in the third direction DR3, and the second image IM2*a* may be displayed in a fourth direction D4 opposite to the third direction DR3.

According to an embodiment of the present disclosure, the folding region FA may be bent about a folding axis extending in a direction parallel to a longer side of the electronic device 1000, for example, a direction parallel to the second direction DR2. The folding region FA has a specific curvature and a specific radius of curvature, when the electronic device 1000 is folded. According to an embodiment, the first non-folding region NFA1 and the second non-folding region NFA2 may face each other, and the electronic device 1000 may be in an inner-folding state, such that the first display unit DA1-F is not exposed to the outside.

According to an embodiment of the present disclosure, the electronic device 1000 may be in an outer-folding state such that the first display unit DA1-F is exposed to the outside. According to an embodiment of the present disclosure, the electronic device 1000 may be changed from the unfolded state to the inner-folding state or the outer-folding state, but the present disclosure is not limited thereto.

Although FIG. 1A illustrates that one folding region FA is defined in the electronic device 1000, the present disclosure is not limited thereto. For example, a plurality of folding axes and a plurality of folding regions corresponding to the plurality of folding axes are defined in an electronic device 1000, and the electronic device 1000 may be in the inner-folding state or the outer-folding state in each of the plurality of folding regions, when unfolded.

According to an embodiment of the present disclosure, at least one of the first display panel DP1 or the second display panel DP2 may sense an input by a pen PN even without a digitizer. The digitizer may be a component that captures physical touch inputs and converts them into digital signals. Accordingly, since the digitizer to sense the pen PN is omitted, the electronic device 1000 may be prevented from being increased in thickness and weight and degraded in flexibility due to the digitizer added. Accordingly, the pen PN can be sensed in the second display panel DP2 in addition to the first display panel DP1.

Figure 2:
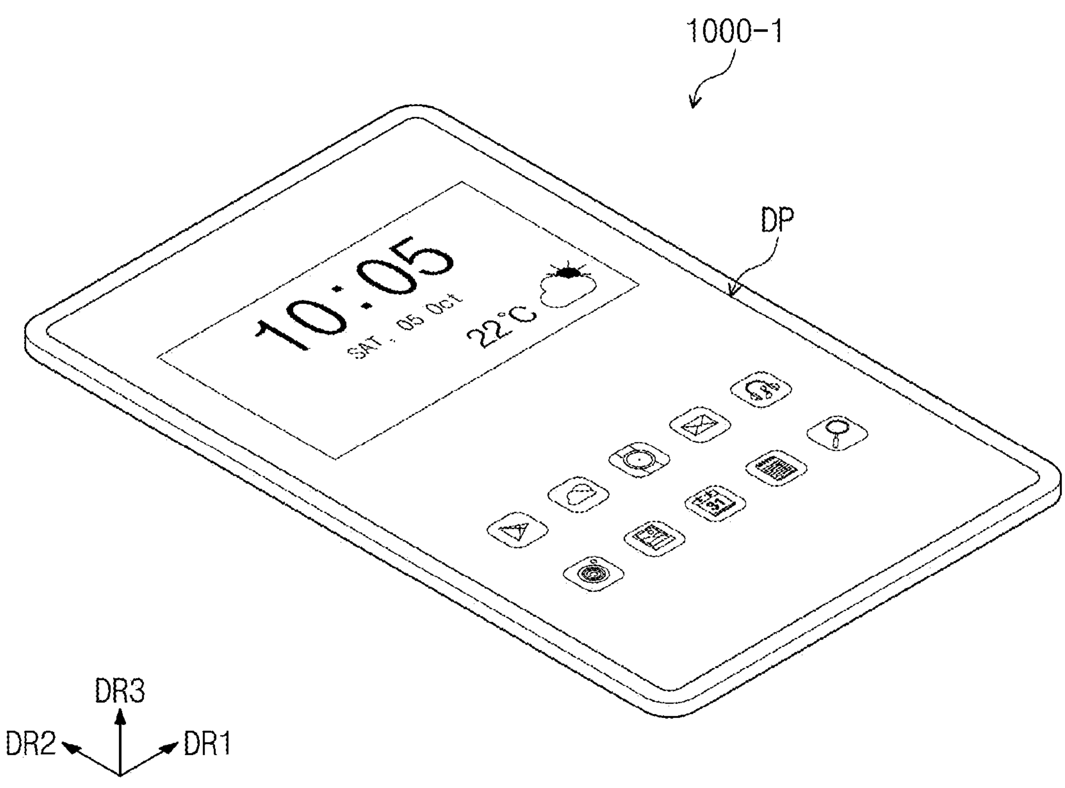
FIG. 2 is a perspective view illustrating an electronic device according to an embodiment of the present disclosure.

FIG. 2 is a rear perspective view illustrating the electronic device 1000-1 according to an embodiment of the present disclosure.

Although FIG. 2 illustrates that the electronic device 1000-1 is a cellular phone, the electronic device 1000-1 may include a display panel DP.

According to an embodiment of the present disclosure, the display panel DP may sense inputs applied to the outside. The external input may be a user input. The input of the user may include any one of various external inputs, such as a part of a physical body of the user, a pen or stylus, light, heat, or pressure, or the combination thereof.

According to an embodiment of the present disclosure, the display panel DP may sense an input made by the pen PN even without the digitizer. Accordingly, since the digitizer to sense the pen PN is omitted, the electronic device 1000-1 may be prevented from being increased in thickness and weight and degraded in flexibility due to the digitizer added.

Although FIG. 1A illustrates the electronic device 1000 in a foldable type, and FIG. 2 illustrates the electronic device 1000-1 in a bar type, the present disclosure is not limited thereto. For example, the following description to be made later may be applied to various electronic devices such as a rollable-type electronic device, a slidable-type electronic device, or a stretchable-type electronic device.

Figure 3:
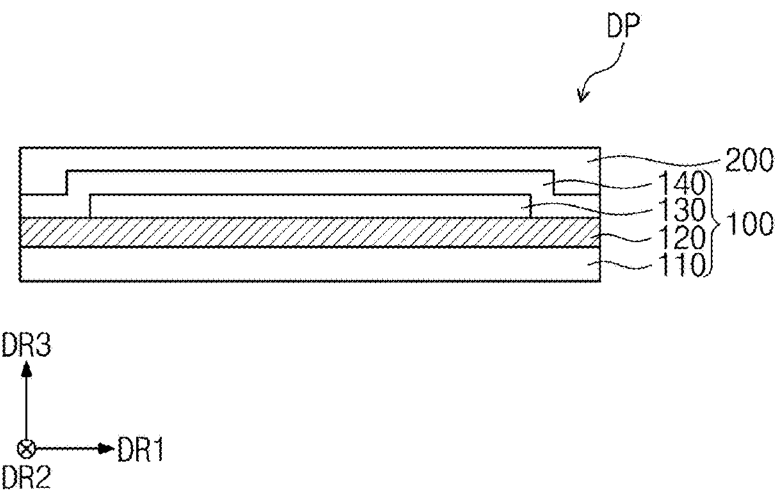
FIG. 3 is a cross-sectional view schematically illustrating a display panel according to an embodiment of the present disclosure.

FIG. 3 is a cross-sectional view schematically illustrating the display panel DP according to an embodiment of the present disclosure.

Referring to FIG. 3, the display panel DP may include a display layer 100 and a sensor layer 200.

The display layer 100 may be a component which substantially generates an image. The display layer 100 may be a light emitting display layer. For example, the display layer 100 may be an organic light emitting display layer, an inorganic light emitting display layer, an organic-inorganic display layer, a quantum dot display layer, a micro-LED display layer, or a nano-LED display layer. The display layer 100 may include a base layer 110, a circuit layer 120, a light emitting element layer 130, and an encapsulation layer 140.

The base layer 110 may be a member which provides a base surface for disposing the circuit layer 120. The base layer 110 may have a multi-layer structure or a single-layer structure. The base layer 110 may be a glass substrate, a metal substrate, a silicon substrate, or a polymer substrate, but the present disclosure is not limited thereto.

The circuit layer 120 may be disposed on the base layer 110. The circuit layer 120 may include an insulating layer, a semiconductor pattern, a conductive pattern, and a signal line. An insulating layer, a semiconductor layer, and a conductive layer may be formed on the base layer 110 through a coating or deposition process. Thereafter, the insulating layer, the semiconductor layer, and the conductive layer may then be selectively patterned through multiple photolithography processes.

The light emitting element layer 130 may be disposed on the circuit layer 120. The light emitting element layer 130 may include a light emitting element. For example, the light emitting element layer 130 may include an organic light emitting material, an inorganic light emitting material, an organic-inorganic light emitting material, a quantum dot, a quantum rod, a micro-LED, or a nano-LED.

The encapsulation layer 140 may be disposed on the light emitting element layer 130. The encapsulation layer 140 may protect the light emitting element layer 130 from foreign substances such as moisture, oxygen, and dust particles.

The sensor layer 200 may be disposed on the display layer 100. The sensor layer 200 may sense an external input applied from the outside. The sensor layer 200 may be an integrated sensor continuously formed during the manufacturing process of the display layer 100, or the sensor layer 200 may be an external sensor attached to the display layer 100. The sensor layer 200 may be referred to as a sensor, an input sensing layer, an input sensing panel, or an electronic device for sensing input coordinates.

According to an embodiment of the present disclosure, the sensor layer 200 is configured to sense both a passive type input unit, such as a user body and an input to an input device generating a magnetic field of a certain resonance frequency. The input device may be referred to as a pen, an input pen, a magnetic pen, a stylus pen, or an electromagnetic resonance pen.

Figure 4:
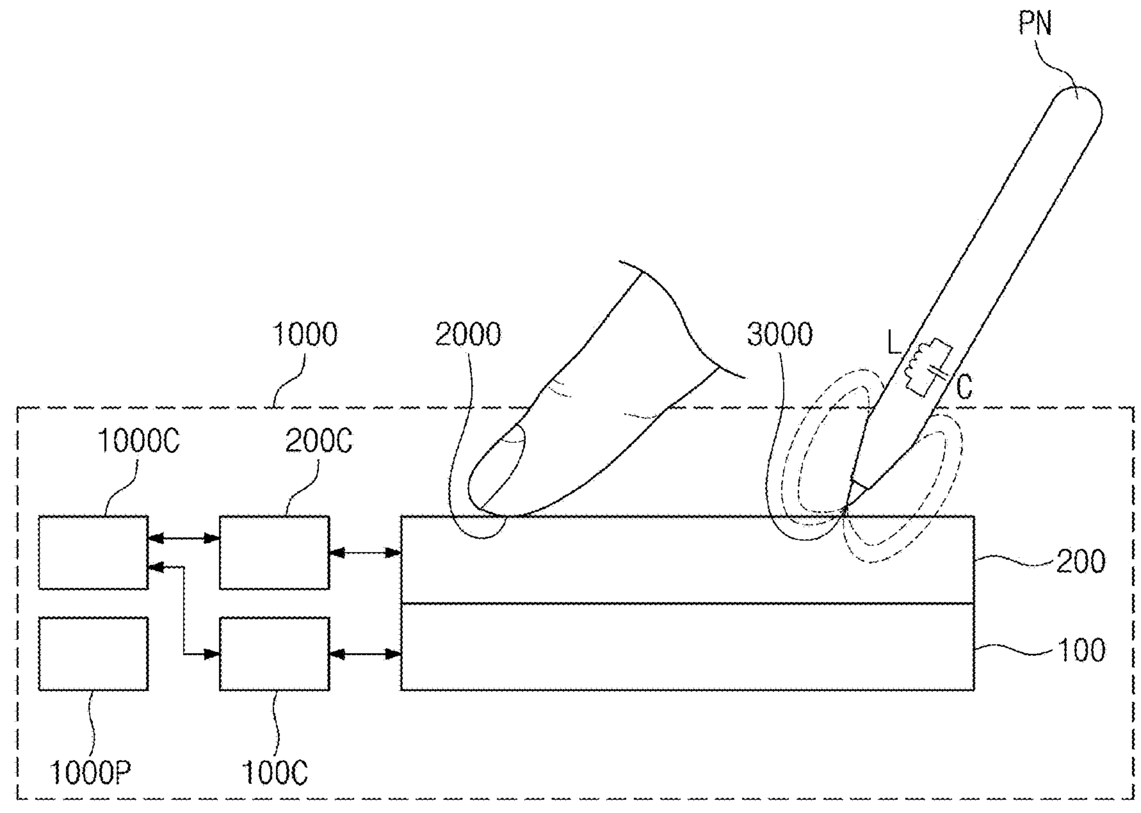
FIG. 4 is a view illustrating the operation of an electronic device according to an embodiment of the present disclosure.

FIG. 4 is a view illustrating an operation of the electronic device 1000 according to an embodiment of the present disclosure.

Referring to FIG. 4, the electronic device 1000 may include the display layer 100, the sensor layer 200, a display driver 100C (e.g., a first driver circuit), a sensor driver 200C (e.g., a second driver circuit), a main driver 1000C (e.g., a third driver circuit), and a power circuit 1000P.

The sensor layer 200 may sense a first input 2000 or a second input 3000 applied from the outside. Each of the first input 2000 and the second input 3000 may cause a change in the capacitance of the sensor layer 200 or cause an induction current in the sensor layer 200. For example, the first input 2000 may be a passive-type input unit, such as a user body. The second input 3000 may be an input made by the pen PN or an input made by a radio-frequency identification (RFID) tag. For example, the pen PN may be a passive-type pen or an active-type pen.

According to an embodiment of the present disclosure, the pen PN may be a device which generates a magnetic field having a certain resonance frequency. The pen PN may be configured to transmit an output signal based on an electromagnetic resonance scheme. The pen PN may be referred to as an input device, an input pen, a magnetic pen, a stylus pen, or an electromagnetic resonance pen.

The pen PN may include an RLC resonance circuit, and the RLC resonance circuit may include an inductor L and a capacitor C. According to an embodiment of the present disclosure, the RLC resonance circuit may be a variable resonance circuit that varies a resonance frequency. In this case, the inductor L may be a variable inductor and/or the capacitor C may be a variable capacitor, but the present disclosure is not limited thereto.

The inductor L generates a current by the magnetic field formed in the sensor layer 200. However, the present disclosure is not limited thereto. For example, when the pen PN operates as an active type, the pen PN may generate a current even though the magnetic field is not provided from the outside. The generated current is transferred to the capacitor C. The capacitor C charges the current input from the inductor L, and discharges the charged current to the inductor L. Thereafter, the inductor L may emit a magnetic field having a certain resonance frequency. An induction current may flow in the sensor layer 200 by the magnetic field emitted by the pen PN, and the induction current may be transmitted to the sensor driver 200C in the form of a receive signal (or a sensing signal).

The main driver 1000C may control the overall operation of the electronic device 1000. For example, the main driver 1000C may control operations of the display driver 100C and the sensor driver 200C. The main driver 1000C may include at least one micro-processor, and may further include a graphic controller. The main driver 1000C may be referred to as an application processor, a central processing unit, or a main processor.

The display driver 100C may drive the display layer 100. The display driver 100C may receive image data and a control signal from the main driver 1000C. The control signal may include various signals. For example, the control signal may include an input vertical synchronization signal, an input horizontal synchronization signal, a main clock, and a data enable signal.

The sensor driver 200C may drive the sensor layer 200. The sensor driver 200C may receive a control signal from the main driver 1000C. The control signal may include a clock signal of the sensor driver 200C. In addition, the control signal may further include a mode determination signal for determining a driving mode of the sensor driver 200C and the sensor layer 200. For example, the mode determination signal may include a value which indicates which mode among a plurality of available modes to the drive sensor driver 200C and the sensor layer 200.

The sensor driver 200C may be implemented in the form of an integrated circuit (IC) to be electrically connected to the sensor layer 200. For example, the sensor driver 200C may be directly mounted on a specific region of the display panel or may be mounted on a separate circuit board through a chip-on-film (COF) scheme to be electrically connected to the sensor layer 200.

The sensor driver 200C and the sensor layer 200 may selectively operate in a first mode or a second mode. For example, the first mode may be a mode for sensing a touch input, for example, the first input 2000. The second mode may be a mode for sensing the pen PN input, for example, the second input 3000. The first mode may be referred to as a touch sensing mode, and the second mode may be referred to as a pen sensing mode.

Switching between the first mode and the second mode may be performed in various ways. For example, the sensor driver 200C and the sensor layer 200 may be time-division-driven into the first mode and the second mode, and may sense the first input 2000 and the second input 3000. The time-division manner may mean that the sensor driver 200C and the sensor layer 200 operate in the first mode for a first period, the sensor driver 200C and the sensor layer 200 operate in the second mode for a second period when the first period ends, and then this operation repeats a certain number of times. Alternatively, switching between the first mode and the second mode may be made due to a user selection or a user specific action, or one of the first mode and the second mode may be activated or deactivated or may be switched from one mode to another mode by activation or deactivation of a specific application. Alternatively, while the sensor driver 200C and the sensor layer 200 are alternately operating in the first mode or the second mode, the first mode may be maintained when the first input 2000 is sensed, or the second mode may be maintained when the second input 3000 is sensed.

The sensor driver 200C may calculate coordinate information of an input based on a signal received from the sensor layer 200 and provide a coordinate signal having the coordinate information to the main driver 1000C. The main driver 1000C may execute an operation corresponding to a user input based on the coordinate signal. For example, the main driver 1000C may operate the display driver 100C to display a new application image on the display layer 100 based on the coordinate information.

The power circuit 1000P may include a power management integrated circuit (PMIC). The power circuit 1000P may generate a plurality of driving voltages for driving the display layer 100, the sensor layer 200, the display driver 100C, and the sensor driver 200C. For example, the plurality of driving voltages may include a gate high voltage, a gate low voltage, a first driving voltage (e.g., an ELVSS voltage), and a second driving voltage (e.g., an ELVDD voltage), and an initialization voltage, but the present disclosure is not limited thereto.

Figure 5:
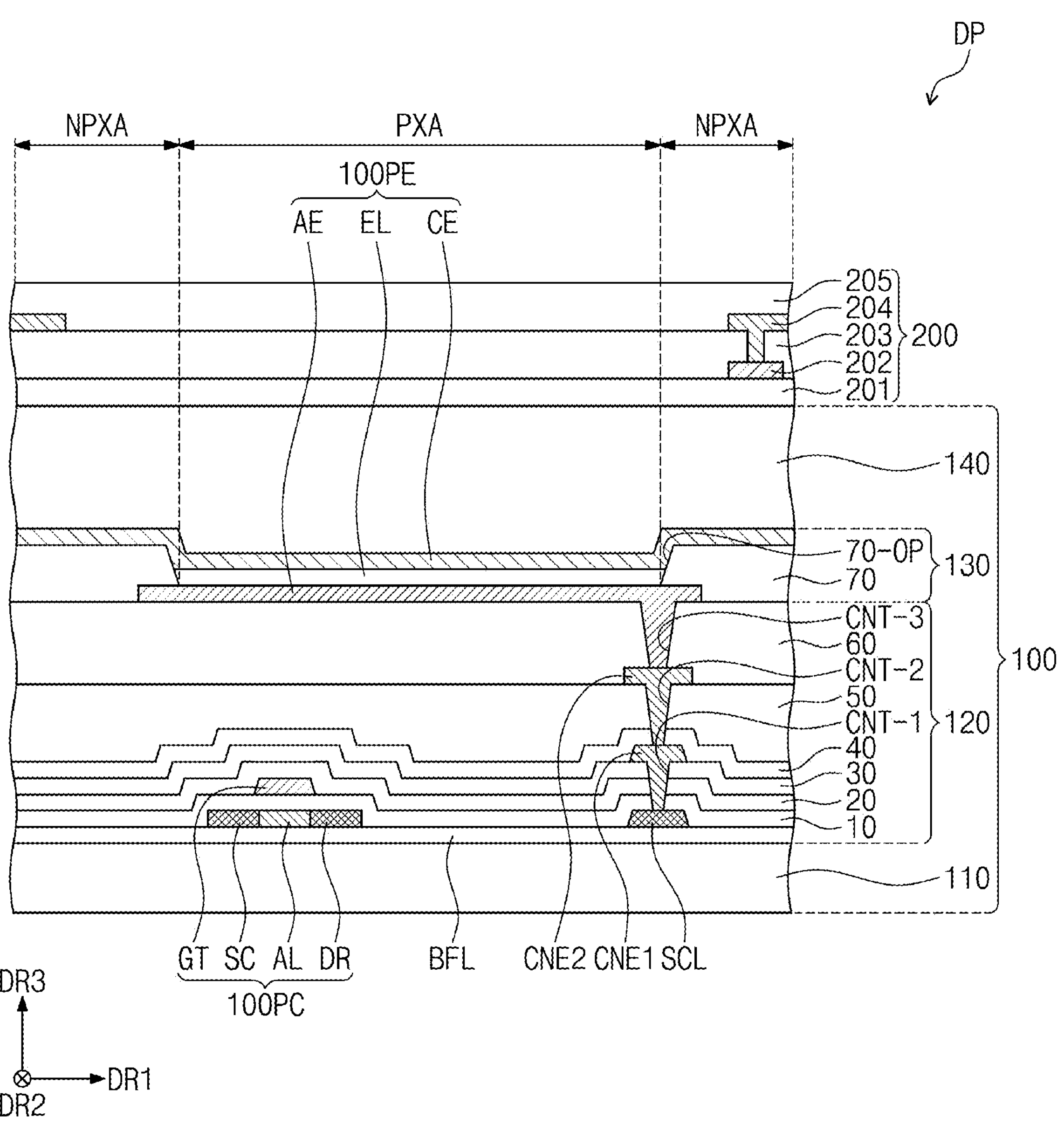
FIG. 5 is a cross-sectional view illustrating a display panel according to an embodiment of the present disclosure.

FIG. 5 is a cross-sectional view of the display panel DP according to an embodiment of the present disclosure.

Referring to FIG. 5, at least one buffer layer BFL is formed on a top surface of the base layer 110. The buffer layer BFL may increase a bonding force between the base layer 110 and the semiconductor pattern. The buffer layer BFL may be formed in a multi-layer structure. Alternatively, the display layer 100 may further include a barrier layer. The buffer layer BFL may include at least one of silicon oxide, silicon nitride, or silicon oxynitride. For example, the buffer layer BFL may include a structure in which a silicon oxide layer and a silicon nitride layer are alternately stacked.

Semiconductor patterns SC, AL, DR, and SCL may be disposed on the buffer layer BFL. The semiconductor patterns SC, AL, DR, and SCL may include polysilicon. However, the present disclosure is not limited thereto, and the semiconductor patterns SC, AL, DR, and SCL may include amorphous silicon, low-temperature polycrystalline silicon, or an oxide semiconductor.

FIG. 5 illustrates only some semiconductor patterns SC, AL, DR, and SCL, and semiconductor patterns may be further disposed in another region. The semiconductor patterns SC, AL, DR, and SCL may be arranged in a specific rule across the pixels. The semiconductor patterns SC, AL, DR, and SCL may have different electrical properties depending on whether the semiconductor patterns SC, AL, DR, and SCL are doped. The semiconductor patterns SC, AL, DR, and SCL may include first regions SC, DR, and SCL having higher conductivity and second regions AL having lower conductivity. The first regions SC, DR, and SCL may be doped with an N-type dopant or a P-type dopant. The P-type transistor may include a doped region doped with a P-type dopant, and the N-type transistor may include a doped region doped with an N-type dopant. The second region AL may be a non-doped region or a region doped with a lower concentration than the first region.

The conductivity of the first regions SC, DR, and SCL may be greater than that of the second region AL, and may substantially serve as an electrode or a signal line. The second region AL may substantially correspond to the active region AL (or channel) of a transistor 100PC. In other words, portions AL of the semiconductor patterns SC, AL, DR, and SCL may be the active region AL of the transistor 100PC, and other portions SC and DR may be the source region SC or the drain region DR of the transistor 100PC, and another portion SCL may be the connection electrode or the connection signal line SCL.

Each of the pixels may have an equivalent circuit including seven transistors, one capacitor, and a light emitting element, but the equivalent circuit of the pixel may be modified in various forms. In FIG. 5, one transistor 100PC and a light emitting element 100PE included in a pixel are illustrated.

The source region SC, the active region AL, and the drain region DR of the transistor 100PC may be formed from the semiconductor patterns SC, AL, DR, and SCL. The source region SC and the drain region DR may extend in opposite directions from the active region AL when viewed in a cross sectional view. A portion of the connection signal line SCL formed from the semiconductor patterns SC, AL, DR, and SCL is illustrated in FIG. 5. The connection signal line SCL may be connected to the drain region DR of the transistor 100PC when viewed in a plan view.

A first insulating layer 10 may be disposed on the buffer layer BFL. The first insulating layer 10 may be commonly overlapped with a plurality of pixels and may cover the semiconductor patterns SC, AL, DR, and SCL. The first insulating layer 10 may be an inorganic layer and/or an organic layer, and may have a single-layer or multi-layer structure. The first insulating layer 10 may include at least one of aluminum oxide, titanium oxide, silicon oxide, silicon nitride, silicon oxynitride, zirconium oxide, or hafnium oxide. According to an embodiment, the first insulating layer 10 may be a single layer of silicon oxide. Not only the first insulating layer 10 but also the insulating layer of the circuit layer 120 to be described later may be an inorganic layer and/or an organic layer, and may have a single-layer or multi-layer structure. The inorganic layer may include at least one of the above-described materials, but the present disclosure is not limited thereto.

A gate GT of the transistor 100PC is disposed on the first insulating layer 10. The gate GT may be a portion of a metal pattern. The gate GT is overlapped with the active region AL. In a process of doping or reducing the semiconductor patterns SC, AL, DR, and SCL, the gate GT may function as a mask.

A second insulating layer 20 is disposed on the first insulating layer 10 and may cover the gate GT. The second insulating layer 20 may be commonly overlapped with pixels. The second insulating layer 20 may be an inorganic layer and/or an organic layer, and may have a single-layer or a multi-layer structure. The second insulating layer 20 may include at least one of silicon oxide, silicon nitride, or silicon oxy nitride. In this configuration, the second insulating layer 20 may have a multi-layer structure including a silicon oxide layer and a silicon nitride layer.

A third insulating layer 30 may be disposed on the second insulating layer 20. The third insulating layer 30 may have a single-layer structure or a multi-layer structure. For example, the third insulating layer 30 may have a multi-layer structure including a silicon oxide layer and a silicon nitride layer.

A first connection electrode CNE1 may be disposed on the third insulating layer 30. The first connection electrode CNE1 may be connected to the connection signal line SCL through a contact hole CNT-1 formed through the first, second, and third insulating layers 10, 20, and 30.

A fourth insulating layer 40 may be disposed on the third insulating layer 30. The fourth insulating layer 40 may be a single-layer silicon oxide layer. The fifth insulating layer 50 may be disposed on the fourth insulating layer 40. The fifth insulating layer 50 may be an organic layer.

A second connection electrode CNE2 may be disposed on the fifth insulating layer 50. The second connection electrode CNE2 may be connected to the first connection electrode CNE1 through a contact hole CNT-2 formed through the fourth insulating layer 40 and the fifth insulating layer 50.

A sixth insulating layer 60 is disposed on the fifth insulating layer 50 and may cover the second connection electrode CNE2. The sixth insulating layer 60 may be an organic layer.

The light emitting element layer 130 may be disposed on the circuit layer 120. The light emitting element layer 130 may include the light emitting element 100PE. For example, the light emitting element layer 130 may include an organic light emitting material, an inorganic light emitting material, an organic-inorganic light emitting material, a quantum dot, a quantum rod, a micro-LED, or a nano-LED. Hereinafter, it is described that the light emitting element 100PE is an organic light emitting element, but the present disclosure is not particularly limited thereto.

The light emitting element 100PE may include a first electrode AE, a light emitting layer EL, and a second electrode CE.

The first electrode AE may be disposed on the sixth insulating layer 60. The first electrode AE may be connected to the second connection electrode CNE2 through a contact hole CNT-3 formed through the sixth insulating layer 60.

A pixel defining layer 70 is disposed on the sixth insulating layer 60 and may cover a portion of the first electrode AE. An opening 70-OP is defined in the pixel defining layer 70. The opening 70-OP of the pixel defining layer 70 exposes at least a portion of the first electrode AE.

The first display unit DA1-F (see FIG. 1A) may include a light emitting region PXA and a non-light emitting region NPXA adjacent to the light emitting region PXA. The non-light emitting region NPXA may surround the light emitting region PXA. According to an embodiment, the light emitting region PXA is defined to correspond to a partial region of the first electrode AE exposed by the opening 70-OP.

The light emitting layer EL may be disposed on the first electrode AE. The light emitting layer EL may be disposed in a region corresponding to the opening 70-OP. In other words, the light emitting layer EL may be formed separately on each of the pixels. When the light emitting layer EL is formed separately on each of the pixels, each of the light emitting layers EL may emit light of at least one color of blue, red, or green. However, the present disclosure is not limited thereto, and the light emitting layer EL may be connected to the pixels and commonly provided. In this case, the light emitting layer EL may provide blue light or white light.

The second electrode CE may be disposed on the light emitting layer EL. The second electrode CE has an integral form and may be included in common in multiple pixels.

According to an embodiment of the present disclosure, a hole control layer may be disposed between the first electrode AE and the light emitting layer EL. The hole control layer may be disposed commonly in the light emitting region PXA and the non-light emitting region NPXA. The hole control layer may include a hole transport layer, and may further include a hole injection layer. An electron control layer may be interposed between the light emitting layer EL and the second electrode CE. The electron control layer may include an electron transport layer, and may further include an electron injection layer. The hole control layer and the electron control layer may be commonly formed in the pixels by using an open mask or inkjet process.

The encapsulation layer 140 may be disposed on the light emitting element layer 130. The encapsulation layer 140 may include an inorganic layer, an organic layer, and an inorganic layer sequentially stacked, but the layers constituting the encapsulation layer 140 are not limited thereto. The inorganic layers may protect the light emitting element layer 130 from moisture and oxygen, and the organic layer may protect the light emitting element layer 130 from foreign substances such as dust particles. The inorganic layers may include a silicon nitride layer, a silicon oxy nitride layer, a silicon oxide layer, a titanium oxide layer, or an aluminum oxide layer. The organic layer may include an acrylic organic layer, but the present disclosure is not limited thereto.

The sensor layer 200 may include a base layer 201, a first conductive layer 202, an intermediate insulating layer 203, a second conductive layer 204, and a cover insulating layer 205.

The base layer 201 may be an inorganic layer including at least one of silicon nitride, silicon oxy nitride, or silicon oxide. Alternatively, the base layer 201 may be an organic layer including epoxy resin, acrylic resin, or imide-based resin. The base layer 201 may have a single-layer structure, or may have a multi-layer structure stacked in the third direction DR3.

Each of the first conductive layer 202 and the second conductive layer 204 may have a single-layer structure or a multi-layer structure stacked in the third direction DR3.

Each of the first and second conductive layers 202 and 204 having a single-layer structure may include a metal layer or a transparent conductive layer. The metal layer may include molybdenum, silver, titanium, copper, aluminum, or the alloy thereof. The transparent conductive layer may include a transparent conductive oxide, such as indium tin oxide (ITO), indium zinc oxide (ZO), zinc oxide (ZnO), or indium zinc tin oxide (IZTO). In addition, the transparent conductive layer may include a conductive polymer such as poly(3,4-ethylenedioxythiophene) (PEDOT), metal nanowire or graphene.

Each of the first conductive layer 202 and the second conductive layer 204 in the multi-layer structure may include a metal layer. The metal layer may have, for example, a three-layer structure of titanium/aluminum/titanium. The conductive layer in the multi-layer structure may include at least one metal layer and at least one transparent conductive layer.

According to an embodiment of the present disclosure, the thickness of the first conductive layer 202 is greater than or equal to the thickness of the second conductive layer 204. When the thickness of the first conductive layer 202 is greater than the thickness of the second conductive layer 204, the resistance of components included in the first conductive layer 202 may be reduced. In addition, since the first conductive layer 202 is disposed below the second conductive layer 204, even if the thickness of the first conductive layer 202 is increased, the probability that a pattern of the first conductive layer 202 is visually recognized by reflection of external light may be lower than that of the second conductive layer 204.

According to an embodiment of the present disclosure, a width of a first mesh line included in the first conductive layer 202 is smaller than or equal to a width of a second mesh line included in the second conductive layer 204. When the user views the electronic device 1000 (see FIG. 1A), and the first mesh line has a width smaller than the second mesh line, the probability that the first mesh line is visually recognized by the user may be reduced.

At least one of the intermediate insulating layer 203 and the cover insulating layer 205 may include an inorganic layer. The inorganic layer may include at least one of aluminum oxide, titanium oxide, silicon oxide, silicon nitride, silicon oxy nitride, zirconium oxide, or hafnium oxide.

At least one of the intermediate insulating layer 203 and the cover insulating layer 205 may include an organic layer. The organic layer may include at least one of an acrylic resin, a methacryl resin, polyisoprene, a vinyl resin, an epoxy resin, a urethane resin, a cellulose resin, a siloxane resin, a polyimide resin, a polyamide resin, or a perylene resin.

Although it has been described that the sensor layer 200 includes the first conductive layer 202 and the second conductive layer 204, that is, a total of two conductive layers by way of example, the present disclosure is not limited thereto. For example, the sensor layer 200 may include at least three conductive layers.

Figure 6:
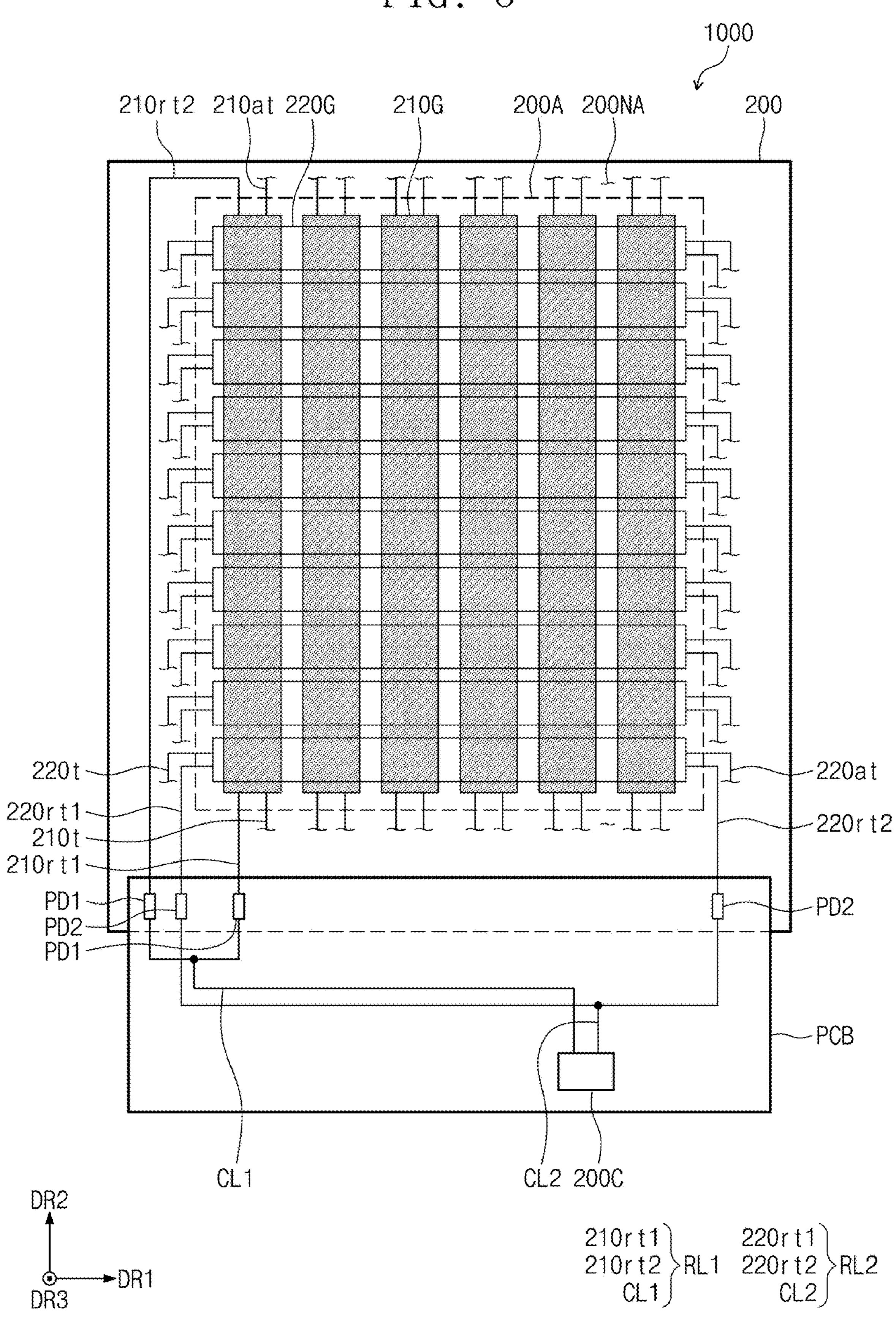
FIG. 6 is a plan view of a sensor layer and a circuit board according to an embodiment of the present disclosure.
Figure 7:
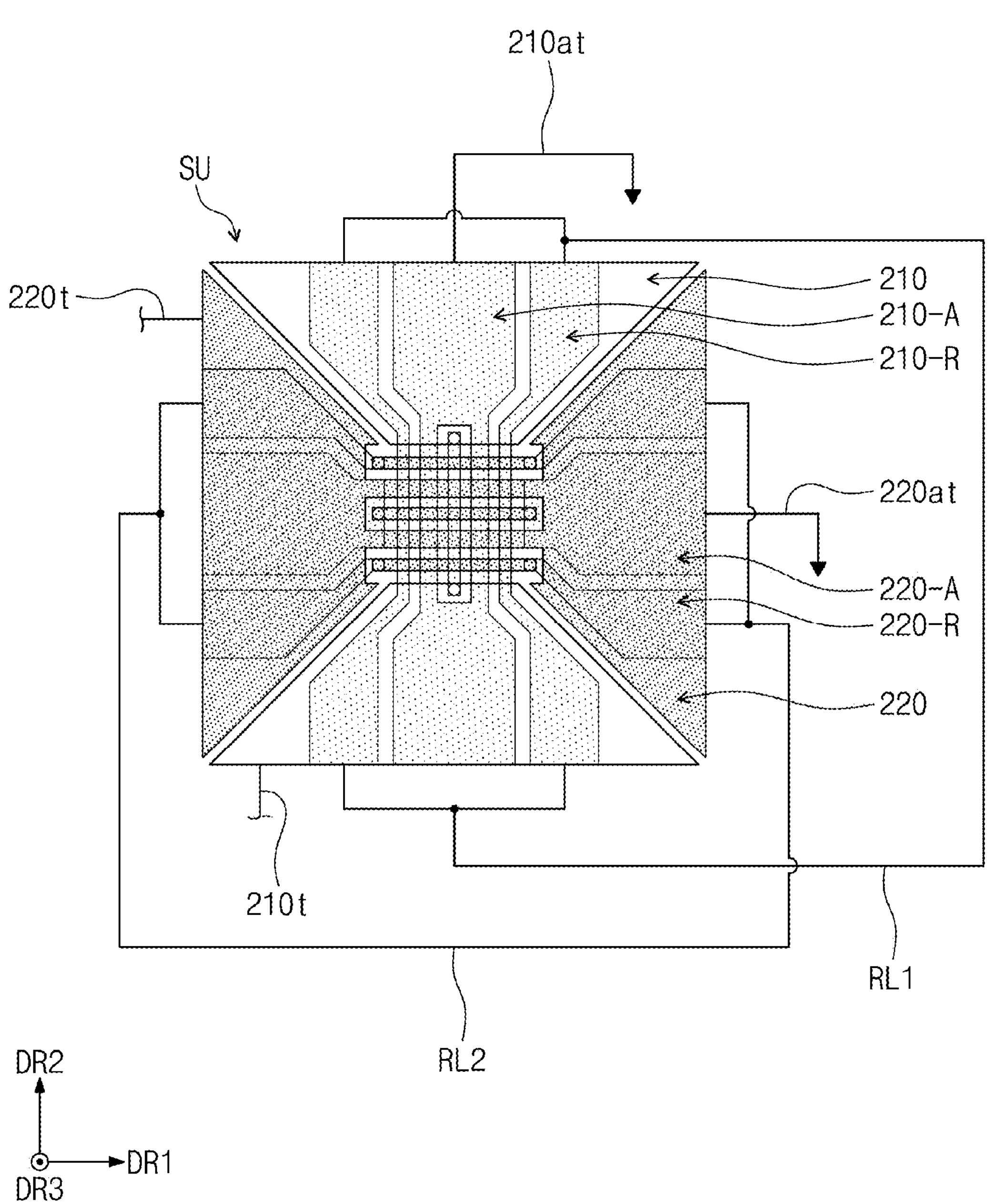
FIG. 7 is a plan view illustrating a sensing unit according to an embodiment of the present disclosure.
Figure 8A:
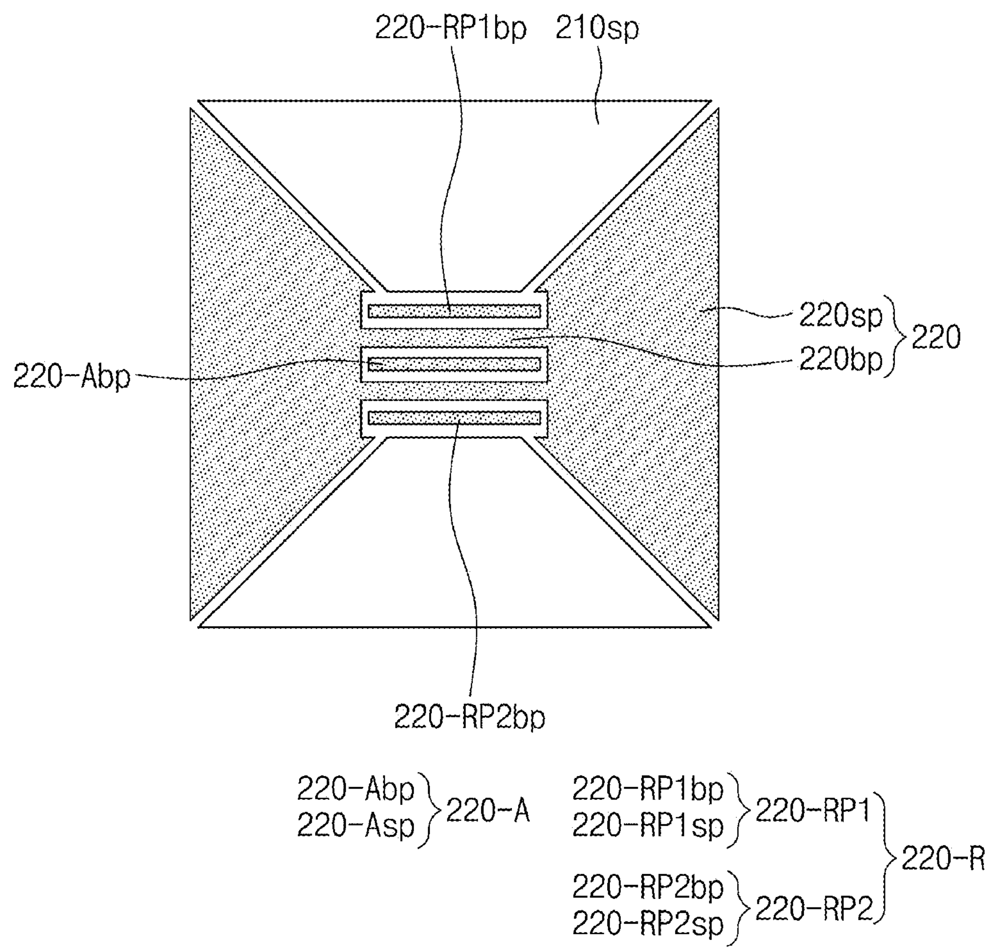
FIG. 8A is a plan view illustrating a second conductive layer of a sensing unit according to an embodiment of the present disclosure.
Figure 8B:
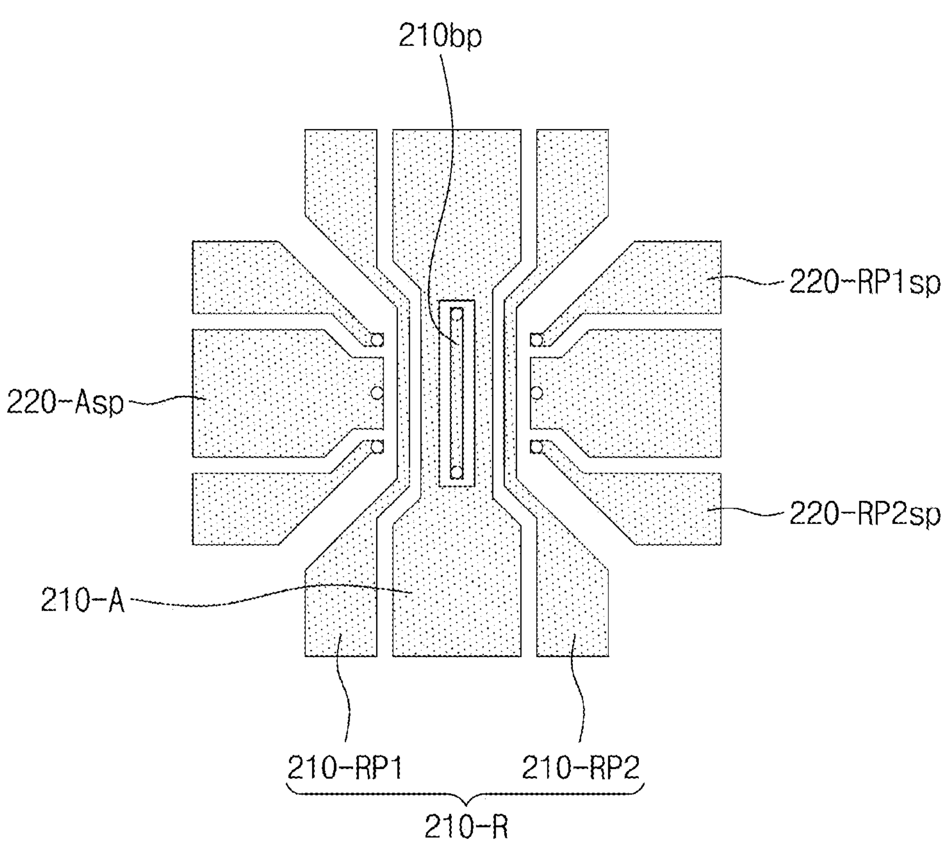
FIG. 8B is a plan view illustrating a first conductive layer of a sensing unit according to an embodiment of the present disclosure.

FIG. 6 is a plan view of the sensor layer 200 and a circuit board PCB according to an embodiment of the present disclosure. FIG. 7 is a plan view of a sensing unit SU according to an embodiment of the present disclosure. FIG. 8A is a plan view illustrating the second conductive layer 204 (see FIG. 5) in the sensing unit SU according to an embodiment of the present disclosure. FIG. 8B is a plan view illustrating the first conductive layer 202 (see FIG. 5) in the sensing unit SU according to an embodiment of the present disclosure.

Referring to FIG. 6, a sensing region 200A and a peripheral region 200NA adjacent to the sensing region 200A may be defined in the sensor layer 200.

The sensor layer 200 may include a plurality of first electrode groups 210G and a plurality of second electrode groups 220G disposed in the sensing region 200A. In an embodiment, each of the first electrode groups 210G cross the second electrode groups 220G. Each of the first electrode groups 210G may extend in the second direction DR2, and the first electrode groups 210G may be arranged to be spaced apart in the first direction DR1. Each of the second electrode groups 220G may extend in the first direction DR1, and the second electrode groups 220G may be arranged to be spaced apart in the second direction DR2.

Although six first electrode groups 210G and 10 second electrode groups 220G are illustrated in FIG. 6 by way of example, the number of first electrode groups 210G and the number of second electrode groups 220G are not limited thereto.

Referring to FIGS. 6, 7, 8A, and 8B, each of the first electrode groups 210G may include a first electrode 210, a first auxiliary electrode 210-A, and a first loop electrode 210-R. Each of the first electrode 210, the first auxiliary electrode 210-A, and the first loop electrode 210-R may extend in the second direction DR2. In an embodiment, each of the first auxiliary electrode 210-A and the first loop electrode 210-R are overlapped with the first electrode 210. In an embodiment, portions of the first electrode 210 are not overlapped by the first auxiliary electrode 210-A or the first loop electrode 210-R. The first loop electrode 210-R may be referred to as a first noise sensing electrode or a first additional electrode.

Each of the second electrode groups 220G may include a second electrode 220, a second auxiliary electrode 220-A, and a second loop electrode 220-R. Each of the second electrode 220, the second auxiliary electrode 220-A, and the second loop electrode 220-R may extend in the first direction DR1. In an embodiment, each of the second auxiliary electrode 220-A and the second loop electrode 220-R are overlapped with the second electrode 220. The second loop electrode 220-R may be referred to as a second noise sensing electrode or a second additional electrode.

The sensor layer 200 may further include a plurality of first trace lines 210*t* and a plurality of second trace lines 220*t* disposed in the peripheral region 200NA. The first trace lines 210*t* may be electrically connected to the first electrodes 210 in a one-to-one correspondence. The second trace lines 220*t* may be electrically connected to the second electrodes 220 in a one-to-one correspondence.

The sensor layer 200 may further include a third trace line 210*at* and a fourth trace line 220*at* disposed in the peripheral region 200NA. In an embodiment, the third trace line 210*at* is electrically connected to the first auxiliary electrodes 210-A. According to an embodiment of the present disclosure, the first auxiliary electrodes 210-A are electrically connected to each other through a single third trace line 210*at*. However, the present disclosure is not limited thereto. For example, a plurality of third trace lines 210*at* may be provided, and the first auxiliary electrodes 210-A may be electrically connected to the third trace lines 210*at* in a one-to-one or a many-to-one correspondence.

In an embodiment, the fourth trace line 220*at* is electrically connected to the second auxiliary electrodes 220-A. According to an embodiment of the present disclosure, the second auxiliary electrodes 220-A is electrically connected to each other through a single fourth trace line 220*at*. However, the present disclosure is not limited thereto. For example, a plurality of fourth trace lines 220*at* may be provided, and the second auxiliary electrodes 220-A may be electrically connected to the fourth trace lines 220*at* in a one-to-one correspondence or a many-to-one correspondence.

Connecting parts of the third trace line 210*at* and connecting parts of the first trace lines 210*t* may be spaced apart from each other in the second direction DR2. The connecting parts of the fourth trace line 220*at* and the connecting parts of the second trace lines 220*t* may be spaced apart from each other in the first direction DR1. The connecting part may be a point where one electrode group and one trace line are electrically connected to each other.

The electronic device 1000 may further include a plurality of first loop lines RL1 and a plurality of second loop lines RL2. The first loop lines RL1 may be electrically connected to the first loop electrodes 210-R, respectively, in a one-to-one correspondence. FIG. 6 representatively illustrates one first loop line RL1 and one second loop line RL2. In an embodiment, the one first loop line RL1 is connected to opposite terminals of one first loop electrode 210-R. Accordingly, one first loop line RL1 and one first loop electrode 210-R may provide (form, define) a closed loop. The second loop lines RL2 may be electrically connected to the second loop electrodes 220-R in a one-to-one correspondence. In an embodiment, one second loop line RL2 is connected to opposite terminals of one second loop electrode 220-R. Accordingly, one second loop line RL2 and one second loop electrode 220-R may provide a closed loop.

In an embodiment, each of the first loop lines RL1 includes a first loop trace line 210*rt*1, a second loop trace line 210*rt*2, and a first connection line CL1. In an embodiment, each of the second loop lines RL2 includes a third loop trace line 220*rt*1, a fourth loop trace line 220*rt*2, and a second connection line CL2.

According to an embodiment of the present disclosure, the second trace lines 220*t* and the third loop trace line 220*rt*1 are disposed on a same side of the sensing region 200A. In FIG. 6, by way of example, the second trace lines 220*t* and the third loop trace line 220*rt*1 are disposed in the left region of the sensing region 200A. According to an embodiment of the present disclosure, the second trace lines 220*t* and the third loop trace line 220*rt*1 are disposed in mutually different layers.

According to an embodiment of the present disclosure, when viewed in a plan view, the second trace lines 220*t* and the third loop trace line 220*rt*1 overlap with each other. In this case, an increase in the area of the peripheral region 200NA may be prevented. According to an embodiment of the present disclosure, the second trace lines 220*t* and the third loop trace line 220*rt*1 have a non-overlap relationship with respect to each other. Alternatively, according to an embodiment of the present disclosure, the second trace lines 220*t* and the third loop trace line 220*rt*1 are partially overlapped with each other. For example, parts of the second trace lines 220*t* and the third loop trace line 220*rt*1 overlap one another and the remaining parts have a non-overlap relationship with respect to each other. For example, the second trace lines 220*t* may have a relationship shifted in the horizontal direction with respect to the third loop trace line 220*rt*1.

According to an embodiment of the present disclosure, the second trace lines 220*t* and the third loop trace line 220*rt*1 are disposed on a same layer. In this case, the second trace lines 220*t* are separated from each other in a region in which the second trace lines 220*t* and the third loop trace lines 220*rt*1 cross each other at a crossing point, and spaced apart from each other at the crossing point with a certain spacing, and the third loop trace line 220*rt*1 may cross the spacing. In this case, a part of the second trace line 220*t* and another part of the second trace line 220*t* spaced apart from each other may be electrically connected to each other by a bridge disposed on another layer. In an embodiment, each of the second trace lines 220*t* may have a bridge structure, but embodiments are not limited thereto. For example, some may not have a bridge structure.

Although FIGS. 6 and 7 illustrate that the third loop trace line 220*rt*1 and the second trace line 220*t* have a non-overlap relationship and are arranged to be spaced apart from each other, the present disclosure is not limited thereto. For example, when the third loop trace line 220*rt*1 and the second trace line 220*t* are arranged on different layers, the third loop trace line 220*rt*1 and the second trace line 220*t* may be overlapped with each other. In addition, although it is illustrated that the fourth trace line 220*at* and the fourth loop trace line 220*rt*2 have a non-overlap relationship and are arranged to be spaced apart from each other, the present disclosure is not limited thereto. For example, when the fourth trace line 220*at* and the fourth loop trace line 220*rt*2 are arranged on different layers, the fourth trace line 220*at* and the fourth loop trace line 220*rt*2 may be overlapped with each other.

The electronic device 1000 may further include the circuit board PCB electrically connected to the sensor layer 200. The sensor driver 200C may be mounted on the circuit board. The first loop trace line 210*rt*1, the second loop trace line 210*rt*2, the third loop trace line 220*rt*1, and the fourth loop trace line 220*rt*2 may be included in the sensor layer 200, and the first connection line CL1 and the second connection line CL2 may be included in the circuit board PCB.

The first and second loop trace lines 210*rt*1 and 210*rt*2 and the first connection line CL1 may be electrically connected to each other through first pads PD1. The third and fourth loop trace lines 220*rt*1 and 220*rt*2 and the second connection line CL2 may be electrically connected to each other through second pads PD2.

According to an embodiment of the present disclosure, the first and second connection lines CL1 and CL2 may be disposed on the circuit board PCB. In this case, since the degree of design freedom may be increased within a relatively large area, difficulties in wiring or designing the wiring may be reduced. In addition, it may be easy to design the first to fourth loop trace lines 210*rt*1, 210*rt*2, 220*rt*1, and 220*rt*2 such that the first to fourth loop trace lines 210*rt*1, 210*rt*2, 220*rt*1, and 220*rt*2 are not overlapped with each other. Accordingly, additional noise generated due to overlapping of the first to fourth loop trace lines 210*rt*1, 210*rt*2, 220*rt*1, and 220*rt*2 may be removed or reduced, and interference between signals may be removed or minimized.

According to an embodiment of the present disclosure, the first to fourth loop trace lines 210*rt*1, 210*rt*2, 220*rt*1, and 220*rt*2 are all disposed within a same conductive layer. In this case, the first to fourth loop trace lines 210*rt*1, 210*rt*2, 220*rt*1, and 220*rt*2 may have a completely non-overlapping arrangement relationship. When the first to fourth loop trace lines 210*rt*1, 210*rt*2, 220*rt*1, and 220*rt*2 are not overlapped with each other, additional noise generated due to overlapping may be removed or reduced, and interference between signals may be removed or minimized.

According to an embodiment of the present disclosure, a subset of the first to fourth loop trace lines 210*rt*1, 210*rt*2, 220*rt*1, and 220*rt*2 may be included in the first conductive layer 202 (see FIG. 5), and the remaining loop trace lines may be disposed in the second conductive layer 204 (see FIG. 5). In this case, the subset of trace lines and the remaining trace lines may have an arrangement relationship in which the subset of trace lines are not completely overlapped with the remaining trace lines. However, the present disclosure is not limited thereto. For example, the subset of trace lines and the remaining trace lines may form a structure in which the subset of trace lines and the remaining trace lines are partially overlapped with each other, or are not partially overlapped with each other.

According to an embodiment of the present disclosure, some of the first to fourth loop trace lines 210*rt*1, 210*rt*2, 220*rt*1, and 220*rt*2 are included in the first conductive layer 202 (see FIG. 5), other trace lines of the first to fourth loop trace lines 210*rt*1, 210*rt*2, 220*rt*1, and 220*rt*2 are disposed in the second conductive layer 204 (see FIG. 5), and the remaining trace lines of the first to fourth loop trace lines 210*rt*1, 210*rt*2, 220*rt*1, and 220*rt*2 are disposed in a third conductive layer. The third conductive layer may be a conductive layer additionally provided under the base layer 201 (see FIG. 5). In this case, it may be easier to design the first to fourth loop trace lines 210*rt*1, 210*rt*2, 220*rt*1, and 220*rt*2 not to be overlapped with each other.

Referring to FIGS. 8A and 8B, the first electrode 210 may include a plurality of sensor patterns 210*sp* and a bridge pattern 210*bp* electrically connecting the sensor patterns 210*sp*. In an embodiment, the bridge pattern 210*bp* is disposed on the same layer as those of the first loop electrode 210-R and the first auxiliary electrode 210-A. According to an embodiment, the bridge pattern 210*bp* may be surrounded by a sidewall defining an opening provided in the first auxiliary electrode 210-A. In an embodiment, the sensor patterns 210*sp* are disposed on different layers from the first loop electrode 210-R and the first auxiliary electrode 210-A, and may be overlapped with the first loop electrode 210-R and the first auxiliary electrode 210-A.

The second electrode 220 may include a plurality of sensor portions 220*sp* and bridge portions 220*bp* connecting the sensor portions 220*sp*. In an embodiment, the sensor portions 220*sp* and the bridge portions 220*bp* are disposed on a same layer and may have an integral shape connected to each other. For example, some of the bridge portions 220*bp* may extend from a single sensor portion 220*sp* to form a single integral layer.

As shown in FIG. 8B, in an embodiment, the first loop electrode 210-R includes a first divided loop electrode 210-RP1 and a second divided loop electrode 210-RP2, which are spaced apart from each other in the first direction DR1. In an embodiment, the first auxiliary electrode 210-A is disposed on the same layer as that of the first divided loop electrode 210-RP1 and the second divided loop electrode 210-RP2, and may be interposed between the first divided loop electrode 210-RP1 and the second divided loop electrode 210-RP2. The first divided loop electrode 210-RP1 may have a shape symmetrical to a shape of the second divided loop electrode 210-RP2. In an embodiment, each of the divided loop electrodes (e.g., 210-RP1 and 210-REP2) includes a rectangular portion connected to and between two thicker shaped portions that are symmetrical to one another.

As shown in FIG. 8A, in an embodiment, the second loop electrode 220-R includes a third divided loop electrode 220-RP1 and a fourth divided loop electrode 220-RP2, which are spaced apart from other in the second direction DR2. The third divided loop electrode 220-RP1 includes first divided loop patterns 220-RP1*sp* and a first divided loop bridge 220-RP1*bp*, and the fourth divided loop electrode 220-RP2 may include second divided loop patterns 220-RP2*sp* and a second divided loop bridge 220-RP2*bp*. The second auxiliary electrode 220-A may include second auxiliary patterns 220-Asp (e.g., see FIG. 8B) and a second auxiliary bridge 220-Abp (e.g., see FIG. 8A). In an embodiment, the second auxiliary bridge 220-Abp has a rectangular shape.

The first divided loop patterns 220-RP1*sp*, the second divided loop patterns 220-RP2*sp*, and the second auxiliary patterns 220-Asp are included on the same layer, and may be included in, for example, the first conductive layer 202 (see FIG. 5). The first divided loop bridge 220-RP1*bp*, the second divided loop bridge 220-RP2*bp*, and the second auxiliary bridge 220-Abp are included on the same layer, and may be included in, for example, the second conductive layer 204 (see FIG. 5).

Referring to FIG. 8B, the first conductive layer 202 may further include dummy patterns. The dummy patterns may serve to fill a region where the bridge pattern 210*bp*, the first loop electrode 210-R, the first auxiliary electrode 210-A, the first divided loop patterns 220-RP1*sp*, the second divided loop patterns 220-RP2*sp*, and the second auxiliary patterns 220-Asp are not disposed. Each of the dummy patterns may be electrically floated or electrically grounded. When the dummy patterns are disposed in an empty space, the probability that specific patterns are visually recognized due to reflection of external light may be reduced. In other words, the electronic device 1000 (see FIG. 1A) with increased visibility resulting from the reflection of external light may be provided.

According to an embodiment of the present disclosure, the first conductive layer 202 further includes a dummy electrode interposed between the first loop electrode 210-R and the first auxiliary electrode 210-A. In other words, the first loop electrode 210-R and the first auxiliary electrode 210-A need not face each other directly, but may be spaced apart from each other with the dummy electrode interposed between the first loop electrode 210-R and the first auxiliary electrode 210-A. When the dummy electrodes are disposed, the first auxiliary electrode 210-A and the first loop electrode 210-R adjacent to each other are spaced apart from each other by a certain distance, and noise between the first auxiliary electrode 210-A and the first loop electrode 210-R may be reduced.

As described above, although FIGS. 6 to 8B illustrate a structure in which the first electrode 210, the first auxiliary electrode 210-A, the first loop electrode 210-R, the second electrode 220, the second auxiliary electrode 220-A, and the second loop electrode 220-R are divided and disposed between two conductive layers 202 and 204 (see FIG. 5), the present disclosure is not limited thereto. For example, the first electrode 210, the first auxiliary electrode 210-A, the first loop electrode 210-R, the second electrode 220, the second auxiliary electrode 220-A, and the second loop electrode 220-R may be implemented in the form of three conductive layers or four conductive layers.

According to an embodiment of the present disclosure, the sensor layer 200 further includes a third conductive layer disposed under the base layer 201 (see FIG. 4). In this case, some of the first electrode 210, the first auxiliary electrode 210-A, the first loop electrode 210-R, the second electrode 220, the second auxiliary electrode 220-A, and the second loop electrode 220-R may be included in the third conductive layer. For example, only the first auxiliary electrode 210-A may be included in the third conductive layer. However, the present disclosure is not limited thereto. The components included in the first to third conductive layers may be modified in various combinations.

For example, the first electrode 210, the first loop electrode 210-R, the second electrode 220, and the second loop electrode 220-R may be implemented through the first and second conductive layers, and the first auxiliary electrode 210-A and the second auxiliary electrode 220-A may be implemented through the second and third conductive layers. Alternatively, the sensor layer 200 may further include an additional insulating layer disposed under the third conductive layer and a fourth conductive layer disposed under the additional insulating layer, and the first auxiliary electrode 210-A and the second auxiliary electrode 220-A may be implemented through the third and fourth conductive layers.

Alternatively, the first electrode 210, the first auxiliary electrode 210-A, the second electrode 220, and the second auxiliary electrode 220-A may be implemented through first and second conductive layers, and the first loop electrode 210-R and the second loop electrode 220-R may be implemented through second and third conductive layers. Alternatively, the first loop electrode 210-R and the second loop electrode 220-R may be implemented through the third and fourth conductive layers.

Figure 9:
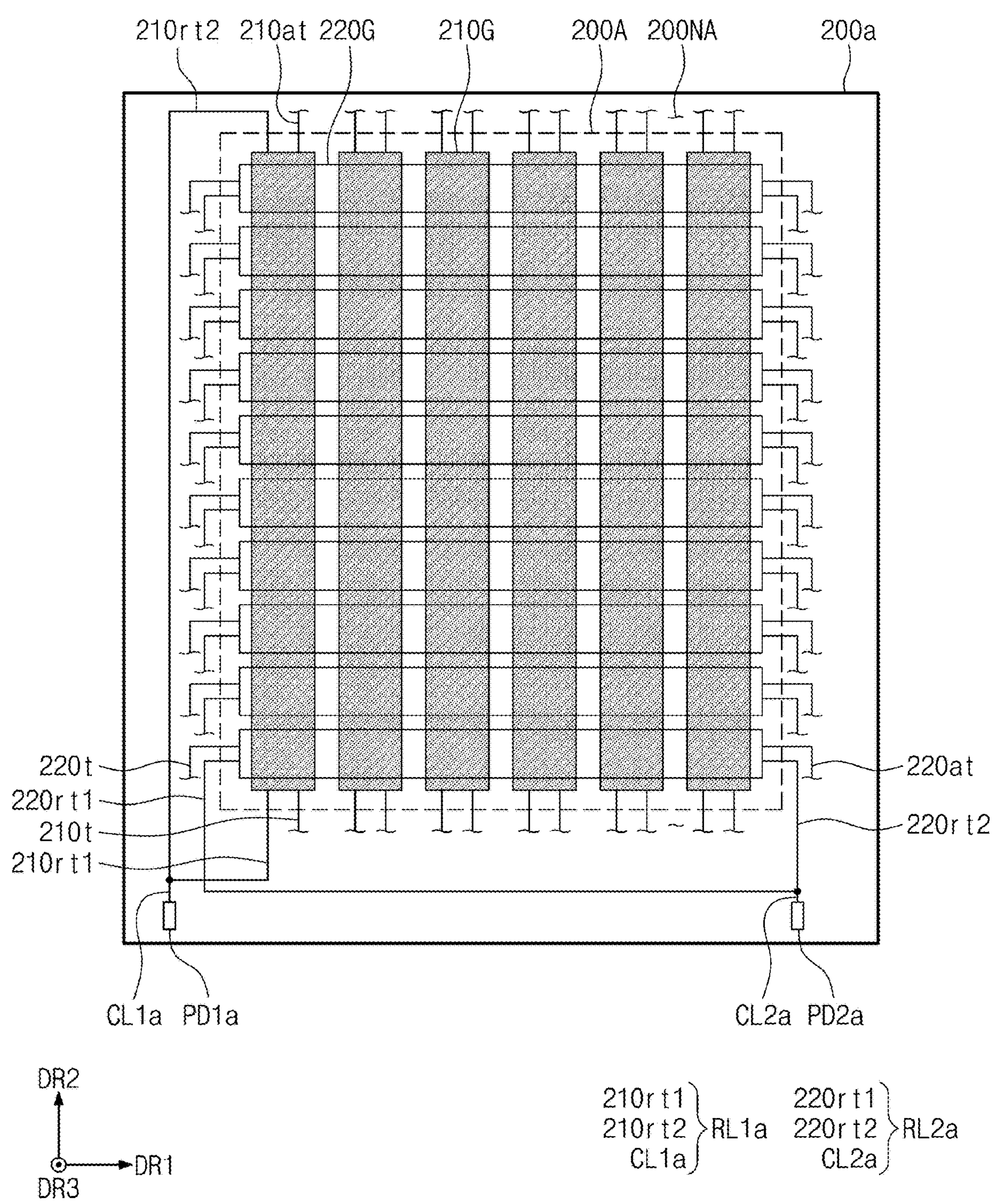
FIG. 9 is a plan view of a sensor layer according to an embodiment of the present disclosure.

FIG. 9 is a plan view of a sensor layer 200*a* according to an embodiment of the present disclosure. In the following description made with reference to FIG. 9, the same reference numerals will be assigned to the same components described with respect to FIG. 6, and the details thereof will be omitted.

Referring to FIGS. 7 and 9, in an embodiment, the sensor layer 200*a* includes the plurality of first electrode groups 210G and the plurality of second electrode groups 220G disposed in the sensing region 200A. In addition, the sensor layer 200*a* may further include the plurality of first trace lines 210*t*, the plurality of second trace lines 220*t*, the third trace line 210*at*, the fourth trace line 220*at*, first loop lines RL1*a*, and a plurality of second loop lines RL2*a* which are disposed in the peripheral region 200NA.

In an embodiment, each of the first loop lines RL1*a* include the first loop trace line 210*rt*1, the second loop trace line 210*rt*2, and a first connection line CL1*a*. In an embodiment, each of the second loop lines RL2*a* include the third loop trace line 220*rt*1, the fourth loop trace line 220*rt*2, and a second connection line CL2*a*. The first loop trace line 210*rt*1 and the second loop trace line 210*rt*2 may be electrically connected to one first pad PD1*a* through the first connection line CL1*a*. One end of the first loop trace line 210*rt*1 and one end of the second loop trace line 210*rt*2 may be connected to the first connection line CL1*a*. In addition, the third loop trace line 220*rt*1 and the fourth loop trace line 220*rt*2 may be electrically connected to one second pad PD2*a* through the second connection line CL2*a*. One end of the third loop trace line 220*rt*1 and one end of the fourth loop trace line 220*rt*2 may be connected to the second connection line CL2*a*.

According to an embodiment of the present disclosure, a closed loop is implemented by one first loop electrode 210-R and one first loop line RL1*a* in the sensor layer 200*a*. In addition, a closed loop may be implemented by one second loop electrode 220-R and one second loop line RL2*a* in the sensor layer 200.

Figure 10:
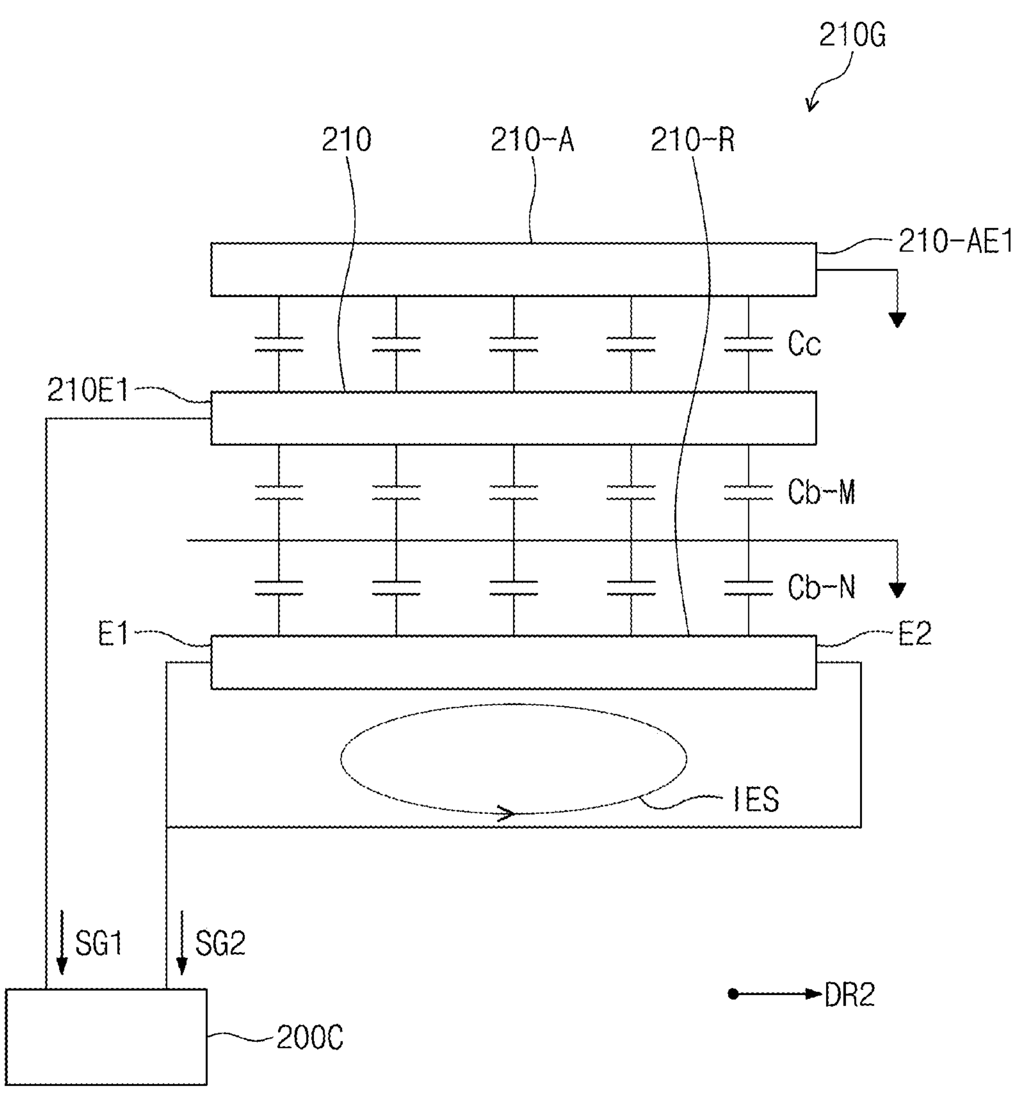
FIG. 10 is a view schematically illustrating an electrode group according to an embodiment of the present disclosure.

FIG. 10 is a view schematically illustrating an electrode group according to an embodiment of the present disclosure. FIG. 10 is a view schematically illustrating a pen sensing mode for sensing the pen PN (see FIG. 4).

Referring to FIGS. 6 and 10, one first electrode group 210G among the first electrode groups 210G and the second electrode groups 220G is representatively illustrated in FIG. 10. The description made with reference to FIG. 10 may be applied to remaining electrodes, which are not described.

In an embodiment, the first electrode group 210G includes the first electrode 210, the first auxiliary electrode 210-A, and the first loop electrode 210-R. In an embodiment, the first electrode 210 and the first auxiliary electrode 210-A are overlapped with each other, and the first electrode 210 and the first loop electrode 210-R are overlapped with each other.

The first trace line 210*t* may be connected to the first electrode 210 in a first region 210E1, and the first auxiliary electrode 210-A and the third trace line 210*at* may be connected to each other in a second region 210-AE1. The first region 210E1 and the second region 210-AE1 may be spaced apart from each other in an extending direction of the first electrode 210, for example, in the second direction DR2.

As the pen PN approaches, an induced electromotive force may be generated in each of the first electrode 210, the first auxiliary electrode 210-A, and the first loop electrode 210-R by the pen PN. Coupling capacitances Cc may be defined between the first electrode 210 and the first auxiliary electrode 210-A. In the sensing mode, the sensor driver 200C may receive an induction current flowing from the first auxiliary electrode 210-A toward the first electrode 210 through the coupling capacitances Cc. In other words, the first auxiliary electrode 210-A may serve to supplement a signal transmitted from the first electrode 210 to the sensor driver 200C.

In addition, when the signal induced in the first auxiliary electrode 210-A and the signal induced in the first electrode 210 are in phase, an effect of supplementing the signal may be increased. Accordingly, in an embodiment, the center of each of the first electrodes 210 in the second direction DR2 coincides with the center of each of the first auxiliary electrodes 210-A in the second direction DR2. In addition, the center of each of the first electrodes 210 in the first direction DR1 may coincide with the center of each of the first auxiliary electrodes 210-A in the first direction DR1. In an embodiment, an edge of a first auxiliary electrode 210-A is aligned with an edge of a first electrode 210.

The first loop line RL1 may be connected to the first and second ends E1 and E2 of the first loop electrode 210-R. For example, the first loop line RL1 may include the first loop trace line 210*rt*1 connected to a first terminal E1 of the first loop electrode 210-R and the second loop trace line 210*rt*2 connected to a second terminal E2 of the first loop electrode 210-R. The first loop line RL1 may further include the first connection line CL1 (see FIG. 6) or CL1*a* (see FIG. 9) connecting the first loop trace line 210*rt*1 and the second loop trace line 210*rt*2.

According to an embodiment of the present disclosure, the first loop electrode 210-R and the first loop line RL1 form a closed loop. In this case, a current IES due to the induced electromotive force generated in the first loop electrode 210-R may be consumed as heat while flowing through the closed loop, and only noise caused by the first loop electrode 210-R may be transferred to the sensor driver 200C.

A first base capacitor Cb-M may be defined in the first electrode 210, and a second base capacitor Cb-N may be defined in the first loop electrode 210-R. Each of the first base capacitor Cb-M and the second base capacitor Cb-N may be referred to as a parasitic capacitor.

According to an embodiment of the present disclosure, a capacitance of the first base capacitor Cb-M and a capacitance of the second base capacitor Cb-N are the same or substantially the same. For example, within a specific error range, the capacitance of the first base capacitor Cb-M and the capacitance of the second base capacitor Cb-N may be the same or substantially the same, and the specific error range may be less than several %. When the capacitance of the first base capacitor Cb-M and the capacitance of the second base capacitor Cb-N are the same or substantially the same, noise caused by the first electrode 210 may be the same or substantially the same as noise caused by the first loop electrode 210-R.

The sensor driver 200C may receive both a first signal SG1 provided from the first electrode 210 and a second signal SG2 provided from the first loop electrode 210-R, and remove the noise by using the first signal SG1 and the second signal SG2. Accordingly, the electronic device 1000 (see FIG. 1A) having increased sensing sensitivity may be provided by increasing a signal-to-noise ratio.

Figure 11:
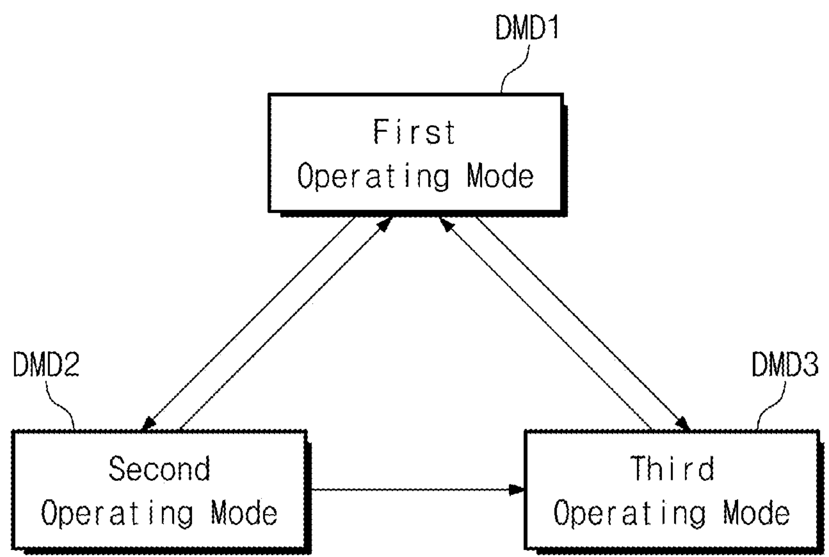
FIG. 11 is a view illustrating the operation of a sensor driver according to an embodiment of the present disclosure.

FIG. 11 is a view illustrating an operation of the sensor driver 200C (see FIG. 4) according to an embodiment of the present disclosure.

Referring to FIGS. 4 and 11, the sensor driver 200C may be configured to be selectively driven in one of a first operating mode DMD1, a second operating mode DMD2, and a third operating mode DMD3.

The first operating mode DMD1 may be referred to as a touch and pen standby mode, the second operating mode DMD2 may be referred to as a touch activation and pen standby mode, and the third operating mode DMD3 may be referred to as a pen activation mode. The first operating mode DMD1 may be a mode for waiting for the first input 2000 and the second input 3000. The second operating mode DMD2 may be a mode for sensing the first input 2000 and waiting for the second input 3000. The third operating mode DMD3 may be a mode for sensing the second input 3000 and waiting for the first input 2000.

According to an embodiment of the present disclosure, the sensor driver 200C may be first driven in the first operating mode DMD1. When the first input 2000 is sensed in the first operating mode DMD1, the sensor driver 200C may be switched (or changed) to the second operating mode DMD2. Alternatively, when the second input 3000 is sensed in the first operating mode DMD1, the sensor driver 200C may be switched (or changed) to the third operating mode DMD3.

According to an embodiment of the present disclosure, when the second input 3000 is sensed in the second operating mode DMD2, the sensor driver 200C may be switched to the third operating mode DMD3. When the first input 2000 is released (or not detected) in the second operating mode DMD2, the sensor driver 200C may be switched to the first operating mode DMD1. When the second input 3000 is released (or not detected) in the third operating mode DMD3, the sensor driver 200C may be switched to the first operating mode DMD1.

Figure 12:
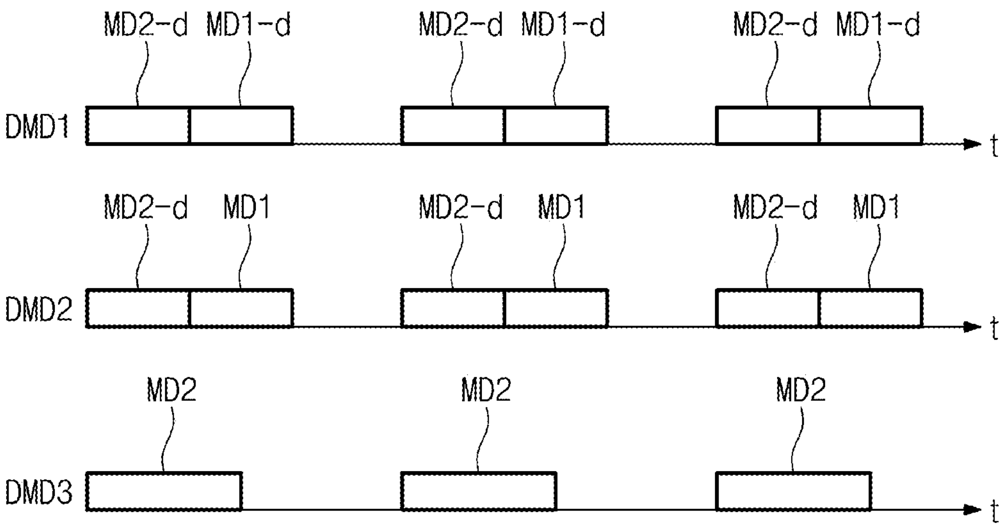
FIG. 12 is a view illustrating the operation of a sensor driver according to an embodiment of the present disclosure.

FIG. 12 is a view illustrating an operation of the sensor driver 200C (see FIG. 4) according to an embodiment of the present disclosure.

Referring to FIGS. 4, 11, and 12, the operations in the first to third operating modes DMD1, DMD2, and DMD3 are illustrated in order of time (t).

In an embodiment of the first operating mode DMD1, the sensor driver 200C is iteratively and alternately driven in a second mode MD2-*d* and a first mode MD1-*d*. In the second mode MD2-*d*, the sensor layer 200 may be scan-driven to detect the second input 3000. In the first mode MD1-*d*, the sensor layer 200 may be scan-driven to detect the first input 2000. For example, being scan-driven may mean that sensing elements of the sensor layer 200 are driven in a row-by-row or column-by-column sequence. Although FIG. 12 illustrates that the sensor driver 200C subsequently operates in the first mode MD1-*d* after operating in the second mode MD2-*d*, the order is not limited thereto.

In an embodiment of the second operating mode DMD2, the sensor driver 200C is iteratively and alternately driven in the second mode MD2-*d* and a first mode MD1. In the second mode MD2-*d*, the sensor layer 200 may be scan-driven to detect the second input 3000. In the first mode MD1, the sensor layer 200 may be scan-driven to detect coordinates through the first input 2000.

In an embodiment of the third operating mode DMD3, the sensor driver 200C is driven in a second mode MD2. In the second mode MD2, the sensor layer 200 may be scan-driven to detect coordinates by the second input 3000. In the third operating mode DMD3, the sensor driver 200C may not operate in the first mode MD1-*d* or MD1 until the second input 3000 is released (or not detected). For example, in the third operation mode DMD3, if the second input 3000 is not detected after a certain period of time, the sensor driver 200C may switch to a different operation mode to operate in the first mode MD1-*d* or MD1.

The above description has been made with reference to FIG. 10 in the pen sensing mode for sensing the pen PN (see FIG. 4). In the second mode MD2, the sensor driver 200C receives both the first signal SG1 provided from the first electrode 210 and the second signal SG2 provided from the first electrode 210-R, and removes noise using the first signal SG1 and the second signal SG2. According to an embodiment of the present disclosure, even in the first mode MD1 for sensing the first input 2000, the sensor driver 200C may receive both the first signal SG1 and the second signal SG2, and remove noise using the first signal SG1 and the second signal SG2.

Figure 13:
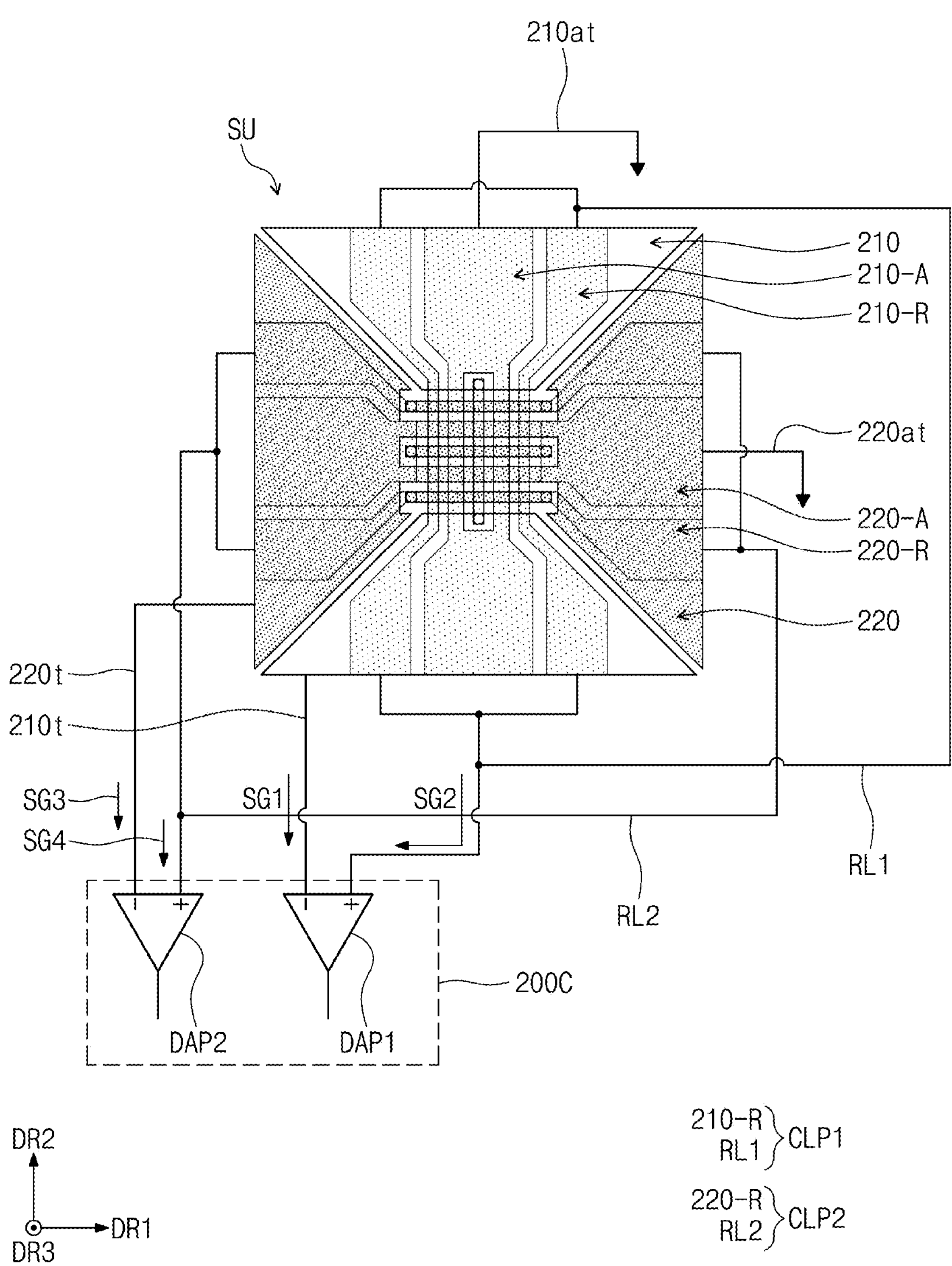
FIG. 13 is a view illustrating one sensing unit and a portion of a sensor driver according to an embodiment of the present disclosure.

FIG. 13 is a view illustrating the sensing unit SU and a portion of the sensor driver 200C according to an embodiment of the present disclosure.

Referring to FIGS. 7 and 13, the sensor driver 200C may receive the first signal SG1 from the first electrode 210, the second signal SG2 from a first closed loop CLP1, a third signal SG3 from the second electrode 220, and a fourth signal SG4 from a second closed loop CLP2. In an embodiment, the sensor driver 200C includes a first differential amplifier DAP1 and a second differential amplifier DAP2.

A first terminal of the first differential amplifier DAP1 may receive the first signal SG1 from the first electrode 210, and a second terminal of the first differential amplifier DAP1 may receive the second signal SG2 from the first closed loop CLP1. The first closed loop CLP1 may be a closed loop formed by the first loop electrode 210-R and the first loop line RL1.

A first terminal of the second differential amplifier DAP2 may receive the third signal SG3 from the second electrode 220, and a second terminal of the second differential amplifier DAP2 may receive the fourth signal SG4 from the second loop electrode 220-R. Although FIG. 13 illustrates that the first terminal is an inverting terminal and the second terminal is a non-inverting terminal, the present disclosure is not limited thereto. For example, the first terminal may be the non-inverting terminal and the second terminal may be the inverting terminal.

The first differential amplifier DAP1 may amplify a signal proportional to the difference between the first signal SG1 and the second signal SG2 to output a first output signal. The second differential amplifier DAP2 may amplify a signal proportional to the difference between the third signal SG3 and the fourth signal SG4 to output a second output signal. Whether the first input 2000 or the second input 3000 has occurred and a position of the input may be determined or recognized from the first and second output signals.

When the sensor layer 200 and the sensor driver 200C operate in the second mode MD2 (see FIG. 12), the first signal SG1 may include a first induction current generated in the first electrode 210, a second induction current generated in the first auxiliary electrode 210-A and received through a coupling capacitor with the first electrode 210, and noise caused by the first electrode 210. The second signal SG2 may include noise caused by the first loop electrode 210-R. In other words, the first signal SG1 and the second signal SG2 may include the same or substantially the same noise signal. In addition, the third signal SG3 and the fourth signal SG4 may also include the same or substantially the same noise signal.

When the first signal SG1 and the second signal SG2 are differentiated in the first differential amplifier DAP1, the noise signal may be removed. In addition, when the third signal SG3 and the fourth signal SG4 are differentiated in the second differential amplifier DAP2, the noise signal may be removed. Accordingly, as the signal-to-noise ratio increases, the electronic device 1000 (see FIG. 1A) having increased sensing sensitivity may be provided. For example, the outputs of the amplifiers DAP1 and DAP2 may be used to determine whether the first input 2000 or the second input 3000 has occurred, and the location of these inputs.

Figure 14:
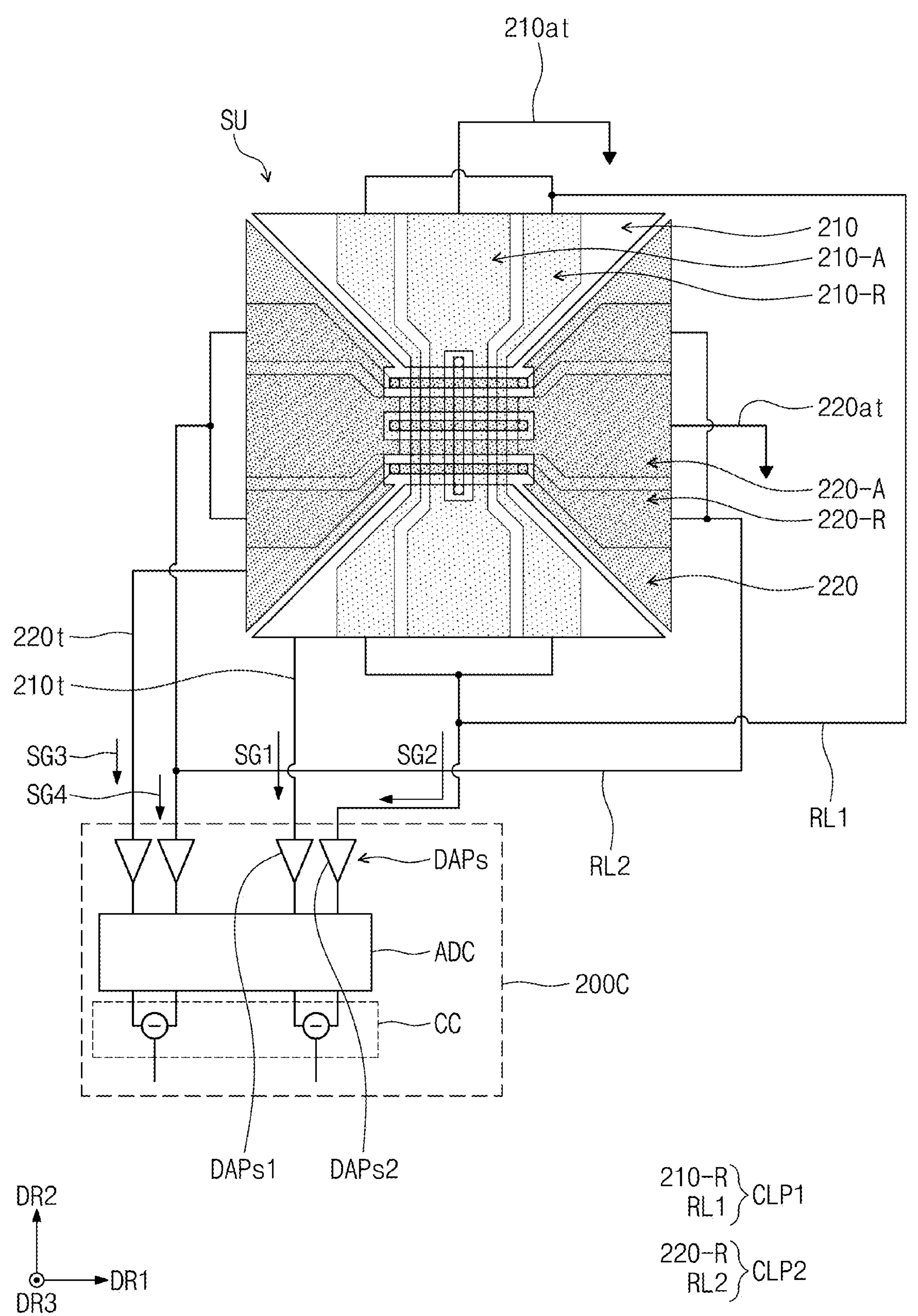
FIG. 14 is a view illustrating one sensing unit and a portion of a sensor driver according to an embodiment of the present disclosure.

FIG. 14 is a view partially illustrating the sensing unit SU and a portion of the sensor driver 200C according to an embodiment of the present disclosure.

Referring to FIG. 14, in the second mode MD2 (see FIG. 12), the sensor driver 200C may receive the first signal SG1 from the first electrode 210, receive the second signal SG2 from the first closed loop CLP1, receive the third signal SG3 from the second electrode 220, and receive the fourth signal SG4 from the second closed loop CLP2.

In an embodiment, the sensor driver 200C includes a plurality of differential amplifiers DAPs, an analog-to-digital converter ADC, and a differential operator CC. The differential amplifiers DAPs may receive the first to fourth signals SG1, SG2, SG3, and SG4, respectively. For example, the first differential amplifier DAPs1 may receive the first signal SG1, and the second differential amplifier DAPs2 may receive the second signal SG2.

The analog-to-digital converter ADC may receive analog signals from the differential amplifiers DAPs and convert the analog signals into digital signals. The differential operator CC may perform a differential operation on data provided from the analog-to-digital converter ADC to output data obtained by removing noise. In an embodiment, a differential circuit of the differential operator CC outputs a derivative of the difference between two inputs. For example, a first differential circuit of the differential operator CC may output a derivative based on outputs of the differential amplifiers that receive the first and second signals SG1 and SG2; and a second differential circuit of the differential operator CC may output a derivative based on outputs of the differential amplifiers that receive the third and fourth signals SG3 and SG4. Accordingly, as the signal-to-noise ratio increases, the electronic device 1000 (see FIG. 1A) having increased sensing sensitivity may be provided.

As described above, the input made by the pen may be sensed in addition to the touch input made through the sensor layer. Accordingly, the electronic device does not need to employ an additional component (for example, a digitizer) for pen sensing. Accordingly, the electronic device may be prevented from being increased in thickness and weight and degrading in flexibility due to the digitizer added. In addition, the sensor layer may include the first electrode, and the first loop electrode and the first loop line to provide the closed loop. The sensor driver may receive the first signal provided from the first electrode and the second signal provided from the closed loop. The sensor driver may remove the nose by using the first signal and the second signal. Accordingly, the electronic device may be provided with an increased sensitivity improved as the signal-to-noise ratio is increased.

Although embodiments of the present disclosure has been described for illustrative purposes, those skilled in the art will appreciate that various modifications, and substitutions are possible, without departing from the scope and spirit of the invention as disclosed in the accompanying claims.

What is claimed is:

1. An electronic device comprising:

a sensor layer; and a sensor driver configured to drive the sensor layer, wherein the sensor layer comprises:

a first electrode;

a first auxiliary electrode overlapped with the first electrode;

a first loop electrode overlapped with the first electrode;

a first loop trace line electrically connected to a first end portion of the first loop electrode; and a second loop trace line electrically connected to a second end portion of the first loop electrode that is spaced apart from the first end portion, and wherein the first loop electrode, the first loop trace line, and the second loop trace line are connected in a first closed loop, and wherein the sensor driver receives a first signal from the first electrode, and receives a second signal from the first closed loop.

2. The electronic device of claim 1, wherein a capacitance of a first base capacitor of the first electrode is substantially the same as a capacitance of a second base capacitor of the first loop electrode.

3. The electronic device of claim 1, wherein the first loop electrode comprises a first divided loop electrode and a second divided loop electrode spaced apart from each other in a first direction, and wherein the first auxiliary electrode is interposed between the first divided loop electrode and the second divided loop electrode.

4. The electronic device of claim 1, wherein the first electrode comprises:

a plurality of sensor patterns overlapped with the first loop electrode and the first auxiliary electrode; and a bridge pattern electrically connected to the plurality of sensor patterns, and wherein the bridge pattern is disposed on a same layer as a layer for the first loop electrode and the first auxiliary electrode.

5. The electronic device of claim 1, wherein the sensor driver comprises:

a differential amplifier, and wherein a first terminal of the differential amplifier receives the first signal, and a second terminal of the differential amplifier receives the second signal.

6. The electronic device of claim 1, wherein the sensor driver comprises:

a plurality of differential amplifiers and an analog-to-digital converter, wherein the plurality of differential amplifiers receive the first signal and the second signal, respectively, wherein the analog-to-digital converter receives a plurality of signals from the plurality of differential amplifiers, and wherein the sensor driver performs a differential operation on data output from the analog-to-digital converter.

7. The electronic device of claim 1, wherein the sensor layer further comprises:

a second electrode crossing the first electrode;

a second auxiliary electrode overlapped with the second electrode and crossing the first auxiliary electrode;

a second loop electrode overlapped with the second electrode and crossing the first loop electrode;

a third loop trace line electrically connected to a third end portion of the second loop electrode; and a fourth loop trace line electrically connected to a fourth end portion of the second loop electrode that is spaced apart from the third end portion, and wherein the second loop electrode, the third loop trace line, and the fourth loop trace line are connected in a second closed loop.

8. The electronic device of claim 7, wherein the sensor layer comprises:

a first trace line electrically connected to the first electrode;

a second trace line electrically connected to the second electrode;

a third trace line electrically connected to the first auxiliary electrode; and a fourth trace line electrically connected to the second auxiliary electrode.

9. The electronic device of claim 8, wherein the first trace line is connected to the first electrode in a first region, wherein the first auxiliary electrode is connected to the third trace line in a second region, and wherein the first region and the second region are spaced apart from each other in a direction in which the first electrode extends.

10. The electronic device of claim 1, further comprising:

a circuit board electrically connected to the sensor layer, wherein the sensor driver is mounted on the circuit board, wherein the circuit board comprises:

a connection line connected to the first loop trace line and the second loop trace line, and wherein the first closed loop further includes the connection line.

11. An electronic device comprising:

a plurality of first electrodes arranged in a first direction and extending in a second direction crossing the first direction;

a plurality of first loop electrodes arranged in the first direction, extending in the second direction, and overlapped with the plurality of first electrodes, respectively; and a plurality of first loop lines electrically connected to the plurality of first loop electrodes in a one-to-one correspondence, wherein one first loop electrode among the plurality of first loop electrodes and one first loop line among the plurality of first loop lines, are connected to one another in a first closed loop that does not include any of the plurality of first electrodes.

12. The electronic device of claim 11, wherein the one first loop line comprises:

a first loop trace line electrically connected to a first end portion of the one first loop electrode;

a second loop trace line electrically connected to a second end portion of the one first loop electrode that is spaced apart from the first end portion; and a connection line connected to the first loop trace line and the second loop trace line.

13. The electronic device of claim 12, further comprising:

a differential amplifier to receive a first signal from one first electrode among the plurality of first electrodes and to receive a second signal from the first closed loop.

14. The electronic device of claim 12, further comprising:

a first differential amplifier to receive a first signal from one first electrode among the plurality of first electrodes;

a second differential amplifier to receive a second signal from the first closed loop;

an analog-to-digital converter to receive signals from the first differential amplifier and the second differential amplifier, to output data; and a differential operator to perform a differential operation on the data.

15. The electronic device of claim 11, wherein a capacitance of a first base capacitor of each of the plurality of first electrodes is the same as a capacitance of a second base capacitor of each of the plurality of first loop electrodes.

16. The electronic device of claim 11, further comprising:

a plurality of second electrodes arranged in the second direction and extending in the first direction;

a plurality of second loop electrodes arranged in the second direction, extending in the first direction, and overlapped with the plurality of second electrodes, respectively; and a plurality of second loop lines electrically connected to the plurality of second loop electrodes in a one-to-one correspondence, wherein one second loop electrode among the plurality of second loop electrodes and one second loop line among the plurality of second loop lines, are connected to one another in a second closed loop.

17. An electronic device comprising:

a sensor layer, and a sensor driver configured to drive the sensor layer and configured to selectively operate in a first mode for sensing a touch input or a second mode for sensing a pen input, wherein the sensor layer comprises:

a first electrode extending in a first direction; a second electrode extending in a second direction crossing the first direction and crossing the first electrode;

a first loop electrode extending in the first direction and overlapped with the first electrode;

a second loop electrode extending in the second direction and overlapped with the second electrode;

a first loop line connected to the first loop electrode in a first closed loop; and a second loop line connected to the second loop electrode in a second closed loop, and wherein the sensor driver receives a first signal from the first electrode, and receives a second signal from the first closed loop, in the second mode.

18. The electronic device of claim 17, wherein the sensor driver comprises:

a differential amplifier, and wherein a first terminal of the differential amplifier receives the first signal, and a second terminal of the differential amplifier receives the second signal.

19. The electronic device of claim 17, wherein the sensor driver comprises:

a plurality of differential amplifiers and an analog-to-digital converter, wherein the plurality of differential amplifiers receive the first signal and the second signal, respectively, in the second mode, wherein the analog-to-digital converter receives a plurality of signals from the plurality of differential amplifiers, and wherein the sensor driver performs a differential operation on data output from the analog-to-digital converter.

20. An electronic device comprising:

a sensor layer including a sensing region and a peripheral region adjacent to the sensing region; and a sensor driver configured to drive the sensor layer, wherein the sensor layer comprises:

a plurality of first electrodes disposed in the sensing region and extending in a first direction;

a plurality of first auxiliary electrodes disposed in the sensing region, disposed to be adjacent to the plurality of first electrodes and extending in the first direction;

a plurality of first loop electrodes disposed in the sensing region, disposed to be adjacent to the plurality of first electrodes, and extending in the first direction;

a first loop trace line disposed in the peripheral region and electrically connected to a first end portion of at least one first loop electrode among the plurality of first loop electrodes;

a second loop trace line disposed in the peripheral region and electrically connected to a second end portion of the at least one first loop electrode that opposes the first end portion; and a connection line disposed in the peripheral region and electrically connected to one end portion of the first loop trace line and one end portion of the second loop trace line, wherein the plurality of first electrodes, the plurality of first auxiliary electrodes, and the plurality of first loop electrodes are electrically insulated from each other.

* * * * *